(12) United States Patent
Biswas et al.

(10) Patent No.: US 9,547,538 B2
(45) Date of Patent: Jan. 17, 2017

(54) SENDING OF MAP INTERACTION DATA TO A PROGRAM

(71) Applicant: Nokia Technologies Oy, Espoo (FI)

(72) Inventors: Debmalya Biswas, Lausanne (SE); Julian Nolan, Pully (SE); Matthew John Lawrenson, Lausanne (SE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/689,031

(22) Filed: Apr. 16, 2015

(65) Prior Publication Data

US 2016/0306687 A1  Oct. 20, 2016

(51) Int. Cl.
*G06F 9/54* (2006.01)
*G06F 3/0484* (2013.01)

(52) U.S. Cl.
CPC ............ *G06F 9/546* (2013.01); *G06F 3/0484* (2013.01)

(58) Field of Classification Search
CPC ............................... G06F 9/546; G06F 3/0484
See application file for complete search history.

(56) References Cited

U.S. PATENT DOCUMENTS

| 8,538,678 B2 | 9/2013 | Arrasvuori et al. |
| 2010/0198814 A1 | 8/2010 | Petersen et al. |
| 2014/0038573 A1* | 2/2014 | Ngo .................. H04W 4/02 455/414.2 |
| 2014/0038644 A1 | 2/2014 | Ngo et al. |
| 2014/0282608 A1 | 9/2014 | Biancalana et al. |

FOREIGN PATENT DOCUMENTS

WO    2010063880 A1   6/2010

OTHER PUBLICATIONS

*ASAM Connects—Standard Detail*, [online] [retrieved Sep. 25, 2015]. Retrieved from the Internet: <URL: http://www.asam.net/nc/home/standards/standard-detail.html?tx_rbwbmasamstandard_pi1%5BshowUid%5D=2547>. (2015) 2 pages.
*RoboEarth—Wikipedia, the free encyclopedia* [online] [retrieved Sep. 25, 2015]. Retrieved from the Internet. <URL: https://en.wikipedia.org/wiki/RoboEarth>. (Sep. 25, 2014) 2 pages.

(Continued)

*Primary Examiner* — Syed Roni
(74) *Attorney, Agent, or Firm* — Alston & Bird LLP

(57) ABSTRACT

A method comprising identifying a source program to send a target program map interaction data set to a target program, identifying a target program map function set that includes at least one target program map function, identifying a source program map function set that includes at least one source program map function, determining a transfer map function set that is a set intersection of the target program map function set and the source program map function set, identifying a source program map interaction data set, determining a target program map interaction data set to include each source program map interaction data item from the source program map interaction data set that corresponds with at least one target program map function of the target program map function set, and sending the target program map interaction data set to the target program is disclosed.

20 Claims, 18 Drawing Sheets

(56) References Cited

OTHER PUBLICATIONS

*Transfer Learning: Robots Teach Other Robots via the Cloud—Businessweek* [online] [retrieved Sep. 25, 2015]. Retrieved from the Internet. <URL: http://www.bloomberg.com/bw/articles/2014-07-03/transfer-learning-robots-teach-other-robots-via-the-cloud>. (Jul. 3, 2014) 5 pages.
Blackberry Developer, "Porting Apps from the BlackBerry PlayBook", https://developer.blackberry.com/native/documentation/gaming_porting/getting_started/porting_from_playbook.html, (Downloaded from the web Aug. 8, 2015).
Rahman et al., "Preserving User Privacy in Pervasive Environments with a Collaborative Model", Jun. 18-20, 2013, pp. 84-93.

* cited by examiner

| Map Interaction Data Item 544A | Map Interaction Data Set 544B |
|---|---|
| Map Interaction Data Item 546A | Map Interaction Data Set 546B |
| Map Interaction Data Item 548A | Map Interaction Data Set 548B |

FIG. 5D

| Map Interaction Data Item 564A | Trust Threshold 564B |
|---|---|
| Map Interaction Data Item 566A | Trust Threshold 566B |
| Map Interaction Data Item 568A | Trust Threshold 568B |

FIG. 5E

| Map Interaction Data Item 574A | Geographical Region 574B |
|---|---|
| Map Interaction Data Item 576A | Geographical Region 576B |
| Map Interaction Data Item 578A | Geographical Region 578B |

FIG. 5F

SENDING OF MAP INTERACTION DATA TO A PROGRAM

TECHNICAL FIELD

The present application relates generally to sending of map interaction data to a program.

BACKGROUND

As electronic apparatuses become increasingly prevalent and pervasive in our society, people increasingly utilize electronic apparatuses to view map information. Many users may utilize electronic apparatuses for purposes relating to viewing particular map information. As such, it may be desirable to configure an electronic apparatus such that the electronic apparatus facilitates viewing particular map information in an intuitive and simple manner.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for identifying a source program to send a target program map interaction data set to a target program, identifying a target program map function set that includes at least one target program map function, the target program map function being a map function provided to a user by the target program, identifying a source program map function set that includes at least one source program map function, the source program map function being a map function provided to a user by the source program, determining a transfer map function set that is a set intersection of the target program map function set and the source program map function set, identifying a source program map interaction data set that includes a source program map interaction data item for each element of map interaction data that is transferable by the source program, determining a target program map interaction data set to include each source program map interaction data item from the source program map interaction data set that corresponds with at least one target program map function of the target program map function set, and sending the target program map interaction data set to the target program.

One or more example embodiments may provide an apparatus, a computer readable medium, a computer program product, and/or a non-transitory computer readable medium having means for identifying a source program to send a target program map interaction data set to a target program, means for identifying a target program map function set that includes at least one target program map function, the target program map function being a map function provided to a user by the target program, means for identifying a source program map function set that includes at least one source program map function, the source program map function being a map function provided to a user by the source program, means for determining a transfer map function set that is a set intersection of the target program map function set and the source program map function set, means for identifying a source program map interaction data set that includes a source program map interaction data item for each element of map interaction data that is transferable by the source program, means for determining a target program map interaction data set to include each source program map interaction data item from the source program map interaction data set that corresponds with at least one target program map function of the target program map function set, and means for sending the target program map interaction data set to the target program.

In at least one example embodiment, a map interaction data set is a set of map interaction data items that are transferable by a program.

In at least one example embodiment, each map interaction data item of the map interaction data set is indicative of a user configurable aspect that governs a manner in which the user interacts with the program.

In at least one example embodiment, the source program is a program that is configured to store the source program map interaction data set in response to user configuration of the source program.

In at least one example embodiment, the source program map interaction data set comprises a source program map data set.

In at least one example embodiment, the source program map data set is a set of source program map data items that are transferable by the source program.

In at least one example embodiment, each source program map data item of the source program map data set is indicative of user configurable map information.

In at least one example embodiment, a map data item is at least one of a point of interest, a route, an annotation, a visual representation of a location, and/or the like.

In at least one example embodiment, the target program map interaction data set comprises a target program map data set.

In at least one example embodiment, the determination of the target program map interaction data set comprises determination of the target program map data set to include each source program map data item from the source program map data set that corresponds with at least one target program map function of the target program map function set.

In at least one example embodiment, the source program map interaction data set comprises a source program interaction data set.

In at least one example embodiment, the source program interaction data set is a set of source program interaction data items that are transferable by the source program In at least one example embodiment, each source program interaction data item of the source program interaction data set is indicative of user configurable setting that governs a manner in which the source program presents map information to the user.

In at least one example embodiment, an interaction data item is at least one of a zoom level, a user preference, a search radius, a format, a sequence of actions, and/or the like.

In at least one example embodiment, the target program map interaction data set comprises a target program interaction data set.

In at least one example embodiment, the determination of the target program map interaction data set comprises determination of the target program interaction data set to include each source program interaction data item from the source program interaction data set that corresponds with at least one target program interaction function of the target program interaction function set.

In at least one example embodiment, each map interaction data item of the target program interaction data set indicates a trust threshold that indicates a trust rating restriction with regards to a target program trust rating.

One or more example embodiments further perform determination of a trust rating for the target program, and identification of a filter map interaction data set to include each map interaction data item from the target program map interaction data set that indicates a trust threshold that is beyond the trust rating for the target program.

One or more example embodiments further perform removal, from the target program map interaction data set, of each map interaction data item that is included in the filter map interaction data set.

One or more example embodiments further perform identification of a replacement map interaction data set to include each map interaction data item from the filter map interaction data set that corresponds with an alternative map interaction data item, and replacement of each map interaction data item of the target program map interaction data set that is included in the replacement map interaction data set, with an alternative map interaction data item that corresponds with the map interaction data item.

In at least one example embodiment, the replacement map interaction data set includes each map interaction data item from the filter map interaction data set that corresponds with an alternative map interaction data item that indicates a trust threshold that is within the trust rating for the target program.

In at least one example embodiment, each map interaction data item of the target program interaction data set indicates a geographical region.

One or more example embodiments further perform identification of a geographical region for the target program, and identification of a filter map interaction data set to include each map interaction data item from the target program map interaction data set that indicates a geographical region that fails to at least partially correspond with the geographical region of the target program.

One or more example embodiments further perform removal, from the target program map interaction data set, of each map interaction data item that is included in the filter map interaction data set.

One or more example embodiments further perform identification of a replacement map interaction data set to include each map interaction data item from the filter map interaction data set that corresponds with an alternative map interaction data item, and replacement of each map interaction data item of the target program map interaction data set that is included in the replacement map interaction data set, with an alternative map interaction data item that corresponds with the map interaction item.

In at least one example embodiment, the replacement map interaction data set includes each map interaction data item from the filter map interaction data set that corresponds with an alternative map interaction data item that indicates a geographical region that at least partially corresponds with the geographical region of the target program.

In at least one example embodiment, the source program is included in a source program set.

One or more example embodiments further perform, for each other source program included in the source program set, identification of another source program map function set that includes at least one source program map function, the source program map function being a map function provided to a user by the other source program, determination of another transfer map function set that is a set intersection of the target program map function set and the other source program map function set, identification of another source program map interaction data set that includes a source program map interaction data item for each element of map interaction data that is transferable by the other source program, determination of another target program map interaction data set to include each source program map interaction data item from the other source program map interaction data set that corresponds with at least one target program map function of the target program map function set, and sending of the other target program map interaction data set to the target program.

BRIEF DESCRIPTION OF THE DRAWINGS

For a more complete understanding of one or more example embodiments, reference is now made to the following descriptions taken in connection with the accompanying drawings in which:

FIGS. 5A-5F are diagrams illustrating map interaction data sets according to at least one example embodiment;

DETAILED DESCRIPTION OF THE DRAWINGS

Figure 1:
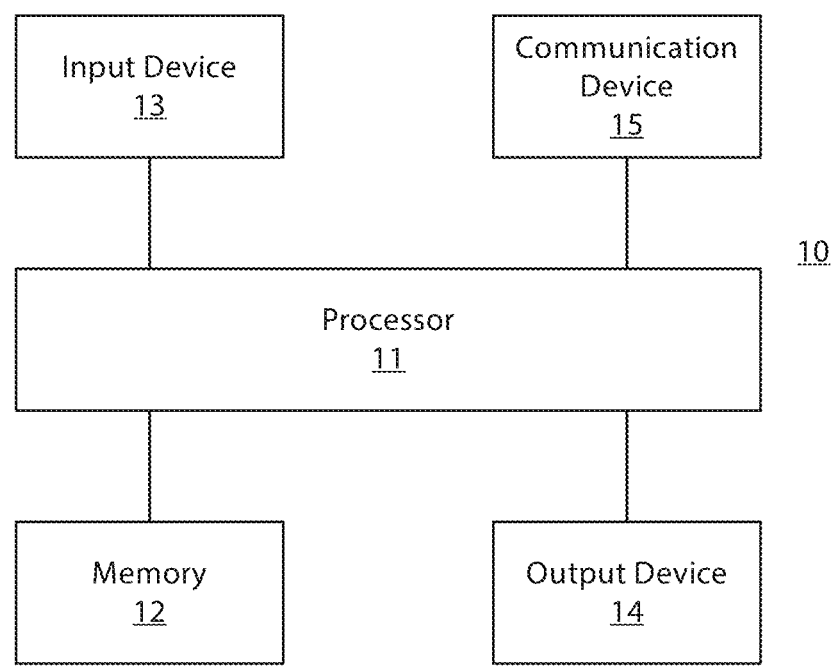
FIG. 1 is a block diagram showing an apparatus according to at least one example embodiment.

Various example embodiments and some of their potential advantages are understood by referring to FIGS. 1 through 12 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, a wearable apparatus, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

FIGS. 2A-2D are diagrams illustrating interactive mapping programs according to at least one example embodiment. The examples of FIGS. 2A-2D are merely examples and do not limit the scope of the claims. For example, the interactive mapping programs may vary, the information displayed may vary, the map interaction data may vary, and/or the like.

In many circumstances, a user may interact with one or more programs, such as an interactive mapping program, a navigation program, and/or the like throughout the day.

Programs, such as an interactive mapping program, a navigation program, and/or the like, may provide particular features to a user of the program. For example, an interactive mapping program may offer navigation features, routing information, mapping information, recommendations, notifications, advertising, and/or the like. Such features may be referred to as map functions. For example, the user may utilize an interactive mapping program on a mobile device, such as a cellular telephone, a tablet computer, and/or the like to identify navigation routes, points of interest, and/or the like. Programs such as these may cause display of visual information based, at least in part, on map functions, user inputs, stored data, retrieved data, and/or the like.

Figure 2A:
FIGS. 2A-2D are diagrams illustrating interactive mapping programs according to at least one example embodiment.

The example of FIG. 2A illustrates visual information representation 200. Visual information representation 200 may be representative of information received, generated, displayed, and/or the like from a program, such as an interactive mapping program, a navigation program, and/or the like. In the example of FIG. 2A, visual information representation 200 comprises visual representations of various roads, as well as visual indicators 202, 204, 206, and 208. In the example of FIG. 2A, visual indicator 202 is representative of a route between the locations represented by visual indicators 204 and 206. For example, visual indicator 204 may be representative of a location of a user's home, and visual indicator 206 may be representative of a location of a user's office. In the example of FIG. 2A, visual indicator 208 is representative of a location of a point of interest along the route represented by visual indicator 202. For example, visual indicator 208 may be representative of a coffee shop. In this manner, a user may view visual information representation 200 and determine that a route corresponding with visual indicator 202 exists between the user's home and office, and that a coffee shop lies along the route at the location corresponding with visual indicator 208.

In some circumstances, a program may cause display of a visual information representation similar to a visual information representation displayed by another program. In circumstances such as these, some of the information represented by the visual information representation may represent similar concepts, such as a map of a similar location, while other information represented by the visual information representation may represent different information, such as different locations, different points of interest, different routes, different types of points of interest, and/or the like.

Figure 2B:
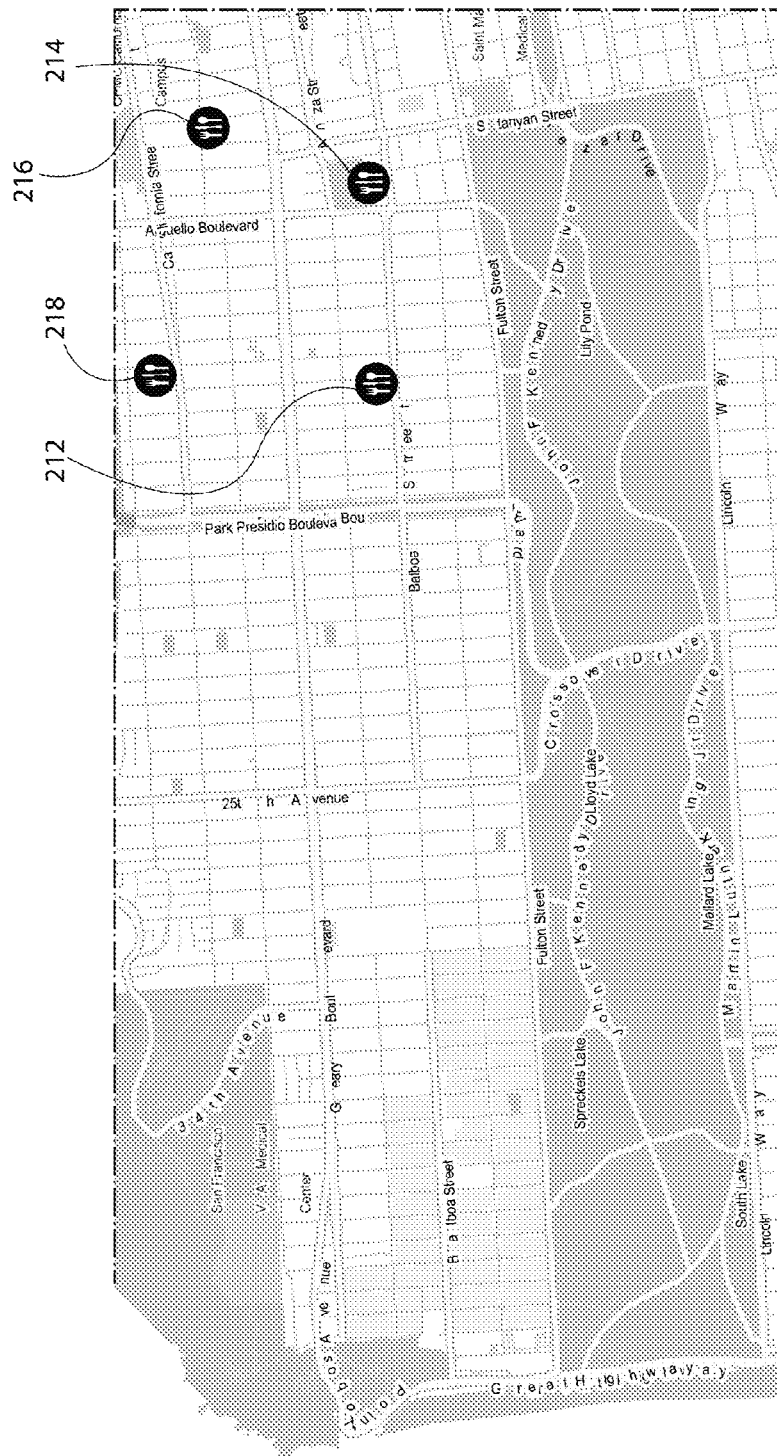

The example of FIG. 2B illustrates visual information representation 210. Visual information representation information 210 may be representative of information received, generated, displayed, and/or the like from a program, such as an interactive mapping program, a navigation program, and/or the like. In the example of FIG. 2B, visual information representation 210 comprises visual representations of various roads, as well as visual indicators 212, 214, 216, and 218. It can be seen that in the example of FIG. 2B, the location represented by visual information representation 210 is similar to the location represented by visual information representation 200 of FIG. 2A. In the example of FIG. 2B, visual indicators 212, 214, 216, and 218 are representative of locations of a points of interest near a location. For example, visual indicators 212, 214, 216, and 218 may be representative of restaurants near the location represented by visual indicator 206 of FIG. 2A. In this manner, a user may view visual information representation 210 and determine that restaurants are located at locations corresponding with visual indicators 212, 214, 216, and 218.

Figure 2C:
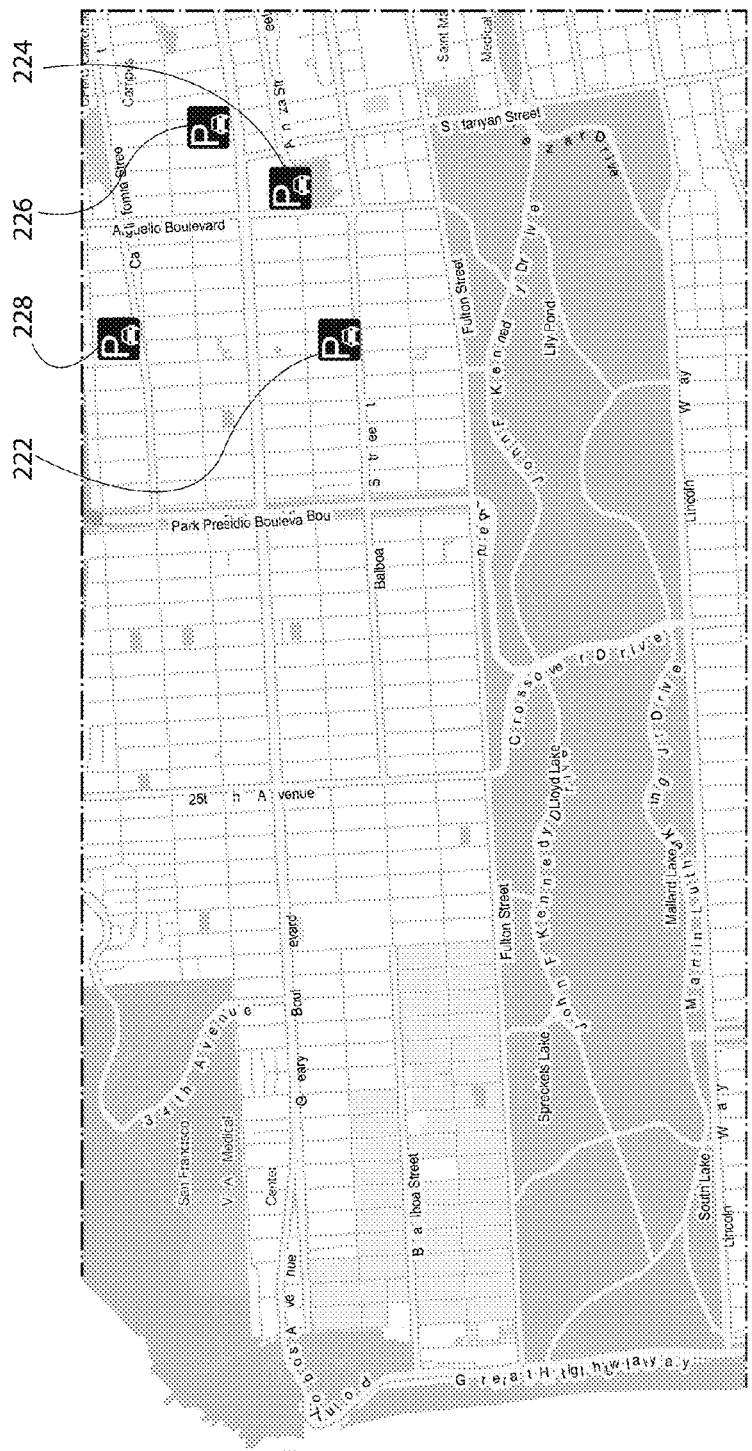

Similarly, the example of FIG. 2C illustrates visual information representation 220. Visual information representation information 220 may be representative of information received, generated, displayed, and/or the like from a program, such as an interactive mapping program, a navigation program, and/or the like. In the example of FIG. 2C, visual information representation 220 comprises visual representations of various roads, as well as visual indicators 222, 224, 226, and 228. It can be seen that in the example of FIG. 2C, the location represented by visual information representation 220 is similar to the location represented by visual information representation 200 of FIG. 2A and visual information representation 210 of FIG. 2B. In the example of FIG. 2C, visual indicators 222, 224, 226, and 228 are representative of locations of points of interest near a location. For example, visual indicators 212, 214, 216, and 218 may be representative of parking lots near the locations represented by visual indicators 212, 214, 216, and 218 of FIG. 2B. In this manner, a user may view visual information representation 220 and determine that parking lots are located at locations corresponding with visual indicators 222, 224, 226, and 228.

In some circumstances, a first visual information representation and a second visual information representation may represent similar information, but the first visual information representation may have a different appearance than the second visual information representation. For example, a first visual information representation may represent a location of a restaurant with a particular icon, and a second visual information representation my represent a location of a restaurant with a different icon.

Figure 2D:
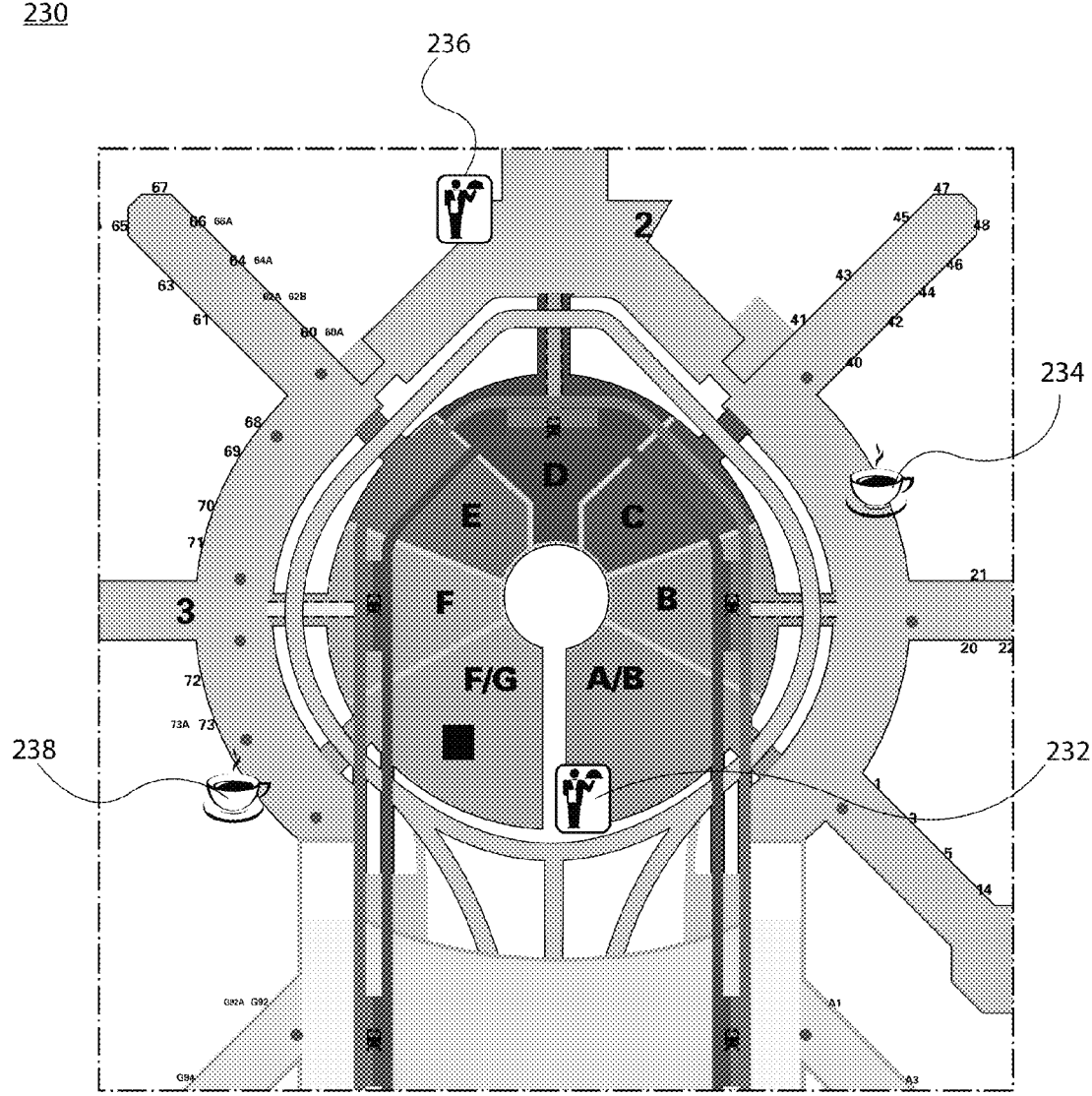

The example of FIG. 2D illustrates visual information representation 230. Visual information representation 230 may be representative of information received, generated, displayed, and/or the like from a program, such as an interactive mapping program, a navigation program, and/or the like. In the example of FIG. 2D, visual information representation 230 comprises visual representations of various passages within a building (e.g. an airport), as well as visual indicators 232, 234, 236, and 238. In the example of FIG. 2D, visual indicators 232, 234, 236, and 238 are representative of locations of a points of interest near within the passageways represented by visual information representation 220. For example, visual indicators 232 and 236 may be representative of the locations of restaurants, and visual indicators 234 and 238 may be representative of the locations of coffee shops. In this manner, a user may view visual information representation 230 and determine restaurants are located at locations corresponding with visual indicators 232 and 236, and that coffee shops are located at locations corresponding with visual indicators 234, 238. It can be seen that visual indicators 232 and 236 of FIG. 2D and that visual indicators 212, 214, 216, and 218 of FIG. 2B may represent the locations of restaurants, even though visual indicators 232 and 236 of FIG. 2D and visual indicators 212, 214, 216, and 218 of FIG. 2B have a different appearance. Similarly, it can be seen that visual indicators 234 and 238 of FIG. 2D and visual indicator 208 of FIG. 2A may represent the location of coffee shops, even though visual indicators 234 and 238 of FIG. 2D and visual indicator 208 of FIG. 2A have a different appearance.

As previously described, a program such as an interactive mapping program, a navigation program, and/or the like may cause display of visual information based, at least in part, on map functions, user inputs, stored data, retrieved data, and/or the like. For example, a program cause display of a visual indicator indicative of a stored value, may cause display of a visual representation in a particular manner (e.g.

with a particular level of zoom) based on a stored user preference, and/or the like. In some circumstances, a map function may utilize information, data, and/or the like to perform a feature, task, and/or the like associated with the function. For example, a map function may utilize a stored address of a user to locate points of interest near the user's home, may utilize a stored preference to display points of interest within a particular radius, and/or the like. Information, data, and/or the like which may be utilized by a map function may be referred to as map interaction data.

In some circumstances, map interaction data may comprise individual elements. The individual elements may be transferable by a program. For example, a set of addresses may be utilized by a map function within a program, and each address may comprise an individual element of data that the program may transfer. An element of map interaction data may be referred to as a map interaction data item. In some circumstances, a plurality of map interaction data items may be organized into a set. For example, a plurality of map interaction data items may be organized into a set similar as described regarding FIGS. 5A-5F. A set of map interaction data items may be referred to as a map interaction data set. In at least one example embodiment, a map interaction data set is a set of map interaction data items that are transferable by a program. In at least one example embodiment, each map interaction data item of the map interaction data set is indicative of a user configurable aspect that governs a manner in which the user interacts with the program. For example, in some circumstances, a map interaction data item may comprise a particular type of data. For example, a map interaction data item may comprise map specific data generated by the user. Map specific data generated by a user may correspond to points of interest saved by the users within the program, preferences with respect to the user's preferred routes, modes of transport, annotated notes corresponding to specific locations on a visual representation of an area such as a map screen, and/or the like. In another example, a map interaction data item may comprise data corresponding to the way a user interacts with a program, such as an interactive mapping program. For example, data corresponding to the way a user interacts with a program may indicate a zoom level setting for different map objects, preferred input and output interfaces, formats, preferred locations for different activities, sequences of action while exploring new destinations, and/or the like. Data corresponding to the way a user interacts with a program may be explicitly specified by the user, generated by monitoring by the program as the user interacts with the program, and/or the like. Map specific data elements generated by a user may be referred to as map data items. In at least one example embodiment, a map data item is at least one of a point of interest, a route, an annotation, a visual representation of a location, and/or the like. Data elements corresponding to the way a user interacts with a program may be referred to as interaction data items. In at least one example embodiment, an interaction data item is at least one of a zoom level, a user preference, a search radius, a format, a sequence of actions, and/or the like.

As previously described, a plurality of map interaction data items may be organized into a set, similarly as described regarding FIGS. 5A-5F. Similarly, map data items within a set of map interaction data items, and interaction data items within a set of map interaction data items, may be organized into sets similarly as described regarding FIGS. 5A-5F. A set of map data items may be referred to as a map data set. A set of interaction data items may be referred to as an interaction data set. In at least one example embodiment, a map interaction data set comprises a map data set. In at least one example embodiment, a map interaction data set comprises an interaction data set.

Figure 3A:
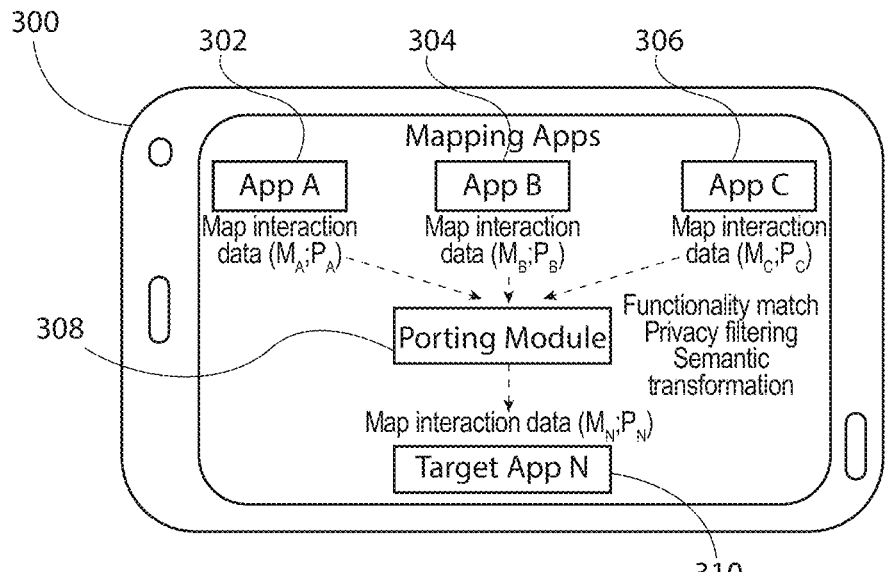
FIGS. 3A-3C are diagrams illustrating sending of map interaction data according to at least one example embodiment.
Figure 3B:
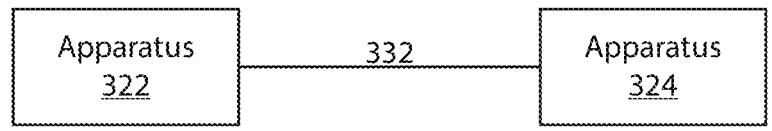
Figure 3C:
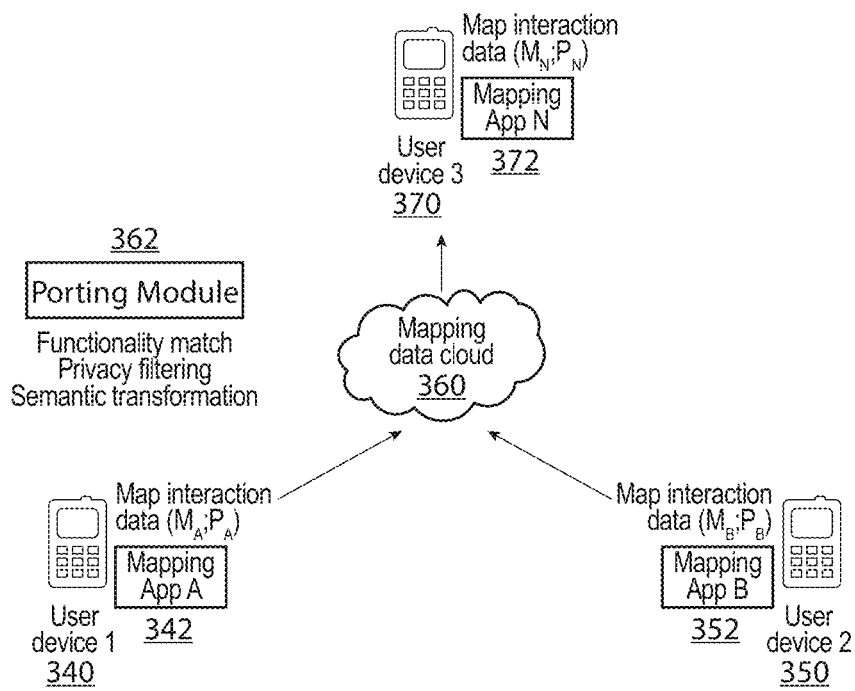

FIGS. 3A-3C are diagrams illustrating sending of map interaction data according to at least one example embodiment. The examples of FIGS. 3A-3C are merely examples and do not limit the scope of the claims. For example, the type of map interaction data may vary, the number of programs may vary, the amount of map interaction data may vary, and/or the like.

As previously described, in many circumstances, a user may interact with one or more programs, such as an interactive mapping program, a navigation program, and/or the like throughout the day. In some circumstances, when a user interacts with more than one program, the different programs may provide different features and functions, may provide similar or identical functions with different results, and/or the like. For example, one program may provide parking recommendations, while another program may provide restaurant recommendations, while yet another program may provide Italian restaurant recommendations, etc. As a user spends more time using programs such as these, each program may aggregate map interaction data items. For example, a user of each application may spend a considerable amount of time and effort configuring each program, each program may "learn" the user's mapping preferences by profiling the user's interactions with the program, and/or the like. In some circumstances, a user may utilize an additional program in the future. For example, the user may install a new program on a device comprising previously used programs, the user may utilize a different device with a different program, and/or the like. In circumstances such as these, it may be desirable for the new program, the different program, and/or the like to utilize map interaction data items aggregated by other programs. For example, if the new program and the previously used programs are both interactive mapping programs, map interaction data items provided to the new program from the previously used program may allow the new program to operate with the user's existing preferences, the new program may need less time to profile the user's habits, and/or the like. A program receiving map interaction data items from another program may be referred to as a target program. A program sending map interaction data items to another program may be referred to as a source program. In circumstances such as these, it may be desirable for the previously used application to send map interaction data items with the new program by way of an automated process. Such a sending of map interaction data items by way of an automated process may allow the user to avoid the time and effort intensive process of configuring the new program.

In circumstances where map interaction data items are sent by way of an automated process, it may be desirable to limit sending of map interaction data items from a source program to map interaction data items that are "relevant" to the target program receiving the map interaction data items. For example, the source program may include map interaction data items that relate to functionality that is unsupported by the target program, the target program may not support a particular format of map interaction data items, and/or the like. In circumstances such as these, limiting sending of map interaction data items from a source program to map interaction data items that are "relevant" to the target program receiving the map interaction data items may make the sending process more efficient.

In circumstances such as these, relevant map interaction data items may be determined by way of a porting module.

A porting module may refer to a program, a subroutine within a program, and/or the like that facilitates the sending of map interaction data items from a source program to a target program. For example, a porting module may utilize an algorithm to identify map interaction data items from a source program that are relevant to the target program. For instance, the porting module may perform at least some of the following operations:

- Classifying the source and target programs according to functionality, trust rating, and geographical region;
- Once each program has been classified, classifying the map interaction data set for each source program according to functionality, trust threshold, and geographical region;
- Identifying one or more source programs to send a map interaction data set to a target program;
- Determining a target program map interaction data set;
- Filtering map interaction data items from the target program map interaction data set according to trust threshold, geographical relevance, and/or the like;
- Performing semantic transformation of map interaction data items; and
- Sending the target program map interaction data set to the target program.

As previously described, a porting module may classify a source program, a target program, and/or the like according to functionality. As previously described, functionality may refer to mapping functionality related features provided by the program. A program may be mapped to more than one functionality label at different levels of abstraction. For instance, $F(a_i)$ may denote the functionality mapping of program $a_i$. For an interactive mapping program $a_i$, providing parking and restaurant recommendations, its functionality mapping $F(a_i)$ includes a map function set $F(a_i)=\{\text{'Recommendation'}, \text{'Parking finder'}, \text{'Restaurants recommendation'}\}$. A map function set may be similar as described regarding FIGS. 5A-5F. In at least one example embodiment, a map function set is identified for a target program that includes at least one map function of the target program. A target program map function may refer to a map function provided to a user by the target program A map function set identified for a target program may be referred to as a target program map function set. In at least one example embodiment, a map function set is identified for a source program that includes at least one map function of the source program. A target source map function may refer to a map function provided to a user by the source program A map function set identified for a source program may be referred to as a source program map function set.

As previously described, a porting module may classify a source program, a target program, and/or the like according to trust rating. For example, the trust rating rating $R(a_i)$ of a program $a_i$ may be computed by taking into account the trustworthiness of the program provider, and its usage privacy context (e.g. if other users are expected to be in viewing range during usage). For example, the trust rating of a program may be indicated by the user, may be determined from a third party (e.g. a website that provides user reviews of programs), and/or the like. In at least one example embodiment, a trust rating for a target program is determined.

As previously described, a porting module may classify a source program, a target program, and/or the like according to geographical region. For example, the applicable geographical region $G(a_i)$ (e.g. country, city, locality, postal code, address, etc.) of a program $a_i$ may be computed for where the program $a_i$ is expected to be used. In at least one example embodiment, a geographical region for a target program is identified.

Inputs for program classification may be gathered automatically based, at least in part, on the program's specifications, in a semi-automatic fashion with a user providing inputs to a dynamically generated form ("learning"), and/or the like. For example, the porting module may utilize documentation related to a program (e.g. a description from an electronic commerce platform, a database entry, and/or the like) to determine the program's functionality. In another example, a porting module may utilize a standard glossary of functionality to provide a form with choices for the user such as "navigation guidance," "friends recommender," "restaurants recommender," and/or the like. A user may select from one of the provided choices to indicate the classification of a program.

As previously described, once a source program has been classified, its map interaction data sets may be classified by a porting module according to functionality, trust threshold, and geographical region. For example, once each program $a_i$ has been classified, the porting module may identify a map interaction data set for each source program that includes a map interaction data item for each element of map interaction data that is transferable by the source program. A map interaction data item that is transferable by a source program may be referred to as a source program map interaction data item. A data set that includes a source program map interaction data item for each element of map interaction data that is transferable by the source program may be referred to as a source program map interaction data set. In at least one example embodiment, a source program is configured to store a source program map interaction data set in response to user configuration of the source program. In at least one example embodiment, a source program map interaction data set is identified that includes a source program map interaction data item for each element of map interaction data that is transferable by the source program.

As previously described, a map interaction data set may comprise a map data set. Similarly, a source program map interaction data set may comprise a source program map data set. A source program map data set may refer to a set of source program map data items that are transferable by the source program. For example, a source program map data set may be similar as described regarding FIGS. 5A-5F. In at least one example embodiment, a source program map interaction data set comprises a source program map data set. In at least one example embodiment, each source program map data item of a source program map data set is indicative of user configurable map information.

As previously described, a map interaction data set may comprise an interaction data set. Similarly, a source program map interaction data set may comprise a source program interaction data set. A source program interaction data set may refer to a set of source program interaction data items that are transferable by the source program. For example, a source program interaction data set may be similar as described regarding FIGS. 5A-5F. In at least one example embodiment, a source program map interaction data set comprises a source program interaction data set. In at least one example embodiment, each source program interaction data item of the source program interaction data set is indicative of user configurable setting that governs a manner in which the source program presents map information to the user.

The map interaction data items in each source programs' map interaction data set ($M_i$; $P_i$) may be classified according to functionality, trust threshold, and geographical region. For instance, each map interaction data $m_{ij}$; $p_{ik}$ in map interaction data set $M_i$; $P_i$ may be mapped to its relevant program functionality subset $f(m_{ij})$; $f(p_{ik}) \subset f(a_i)$. The "relevant" program functionality in this case may correspond to both the map interaction data item $m_{ij}$; $p_{ik}$ acting as an input required to achieve program functionalities $f(m_{ij})$; $f(p_{ik})$, or the map interaction data item $m_{ij}$; $p_{ik}$ being generated (output) as a result of providing program functionality $f(m_{ij})$; $f(p_{ik})$. For instance, while a map interaction data item $m_{ij}$ that corresponds to a restaurant location can be considered as an "output" of the 'Restaurants recommendation' functionality, the same map interaction data item $m_{ij}$ might also act as an "input" for the 'Parking finder' functionality of the program to, for example, find a parking spot close to the selected restaurant. Thus, $f(m_{ij})=\{$'Parking finder', 'Restaurants recommendation'$\}$.

Similarly, each map interaction data item $m_{ij}$; $p_{ik}$ in $M_i$; $P_i$ may be assigned a trust threshold $r(m_{ij})$; $r(p_{ik})$ based on its sensitiveness for the user. For instance, a map interaction data item $m_{ij}$ corresponding to the location of a first restaurant which the user visited in the distant past may be expected to have a lower trust threshold for the user than the location of a second restaurant which the user visits every morning. For example, since the user visits the second restaurant every morning, there may be a high likelihood that the user may be found at the second restaurant at a particular time of day on any given day. As such, the user may desire to keep this information private to better obfuscate his likely location at a particular time of day. The user is much less likely to be at the first restaurant at a particular time on a given day. As such, the user may be less concerned about keeping information indicating his presence at the first restaurant private.

Additionally, each map interaction data item $m_{ij}$; $p_{ik}$ in $M_i$; $P_i$ may be assigned a data items $g(m_{ij})$; $g(p_{ik})$ that may correspond to a geographical location. For instance, for map interaction data items $p_{ik}$, the attribute $g(p_{ik})$ may capture the geographical locations where the program interaction type represented by $p_{ik}$ may be disabled/enabled. For instance, for some locations (e.g. military installations), it may not be possible to "zoom in" beyond a certain location. Similarly, at certain crowded locations, voice (e.g. audio) based program interaction mechanisms may be disabled.

As previously described, a porting module may identify one or more source programs to send a target program map interaction data set to a target program. A map interaction data set sent to a target program may be referred to as a target program map interaction data set. After the source program (s), target program, and the map interaction data sets for each program have been classified as previously described, the porting module may identify relevant source programs to send a target program map interaction data set to a target program by computing the subset C' of "functionally relevant" source programs by determining a set intersection of the target program map function set and the source program map function set for each source program as follows:

$$C'=\{a_{si} \in C | F(a_{si}) \cap F(a_N) \neq \Phi\}$$

where $C=\{a_{s1}, a_{s2}, \ldots, a_{sm}\}$ denotes the set of source programs.

The set intersection of a target program map function set and a source program map function set may be referred to as a transfer map function set. In at least one example embodiment, a transfer map function set is determined that is a set intersection of the target program map function set and the source program map function set.

As previously described, a porting module may determine a target program map interaction data set. For example, the porting module may determine a target program map interaction data set to include each source program map interaction data item from a source program map interaction data set that corresponds with at least one target program map function of a target program map function set as follows:

$$\forall a_{si} \in C',$$

$$M_N=\{m_{ij} \in M_{si} | f(m_{ij}) \subset F(a_N)\} \text{ and}$$

$$P_N=\{p_{ik} \in P_{si} | f(p_{ik}) \subset F(a_N)\}$$

In at least one example embodiment, a target program map interaction data set is determined to include each source program map interaction data item from a source program map interaction data set that corresponds with at least one target program map function of a target program map function set.

As previously described, a map interaction data set may comprise a map data set. Similarly, a target program map interaction data set may comprise a target program map data set. A target program map data set may refer to a set of target program map data items. For example, a target program map data set may be similar as described regarding FIGS. 5A-5F. In at least one example embodiment, a target program map interaction data set comprises a target program map data set. In at least one example embodiment, determination of a target program map interaction data set comprises determination of the target program map data set to include each source program map data item from a source program map data set that corresponds with at least one target program map function of the target program map function set.

As previously described, a map interaction data set may comprise an interaction data set. Similarly, a target program map interaction data set may comprise a target program interaction data set. A target program interaction data set may refer to a set of target program interaction data items. For example, a target program interaction data set may be similar as described regarding FIGS. 5A-5F. In at least one example embodiment, a target program map interaction data set comprises a target program interaction data set. In at least one example embodiment, determination of a target program map interaction data set comprises determination of the target program interaction data set to include each source program interaction data item from a source program interaction data set that corresponds with at least one target program interaction function of the target program interaction function set.

As previously described, a porting module may filter map interaction data items from the target program map interaction data set according to trust threshold. A trust threshold may refer to an indication of a trust rating restriction with regards to a target program trust rating. For instance, a range of trust thresholds 1-10 may exist, where 1 correlates with a "most trusted" trust rating of a program and 10 correlates with a "least trusted" trust rating of a program. A trust threshold of 10 may indicate information that is less sensitive, public information, and/or the like and a trust threshold of 1 may indicate information that is more sensitive, private information, and/or the like. For example, a map interaction data item may have a trust threshold of "3." In this example, a program with a trust rating of "3" or below may be allowed to utilize the map interaction data item, and a program with a trust rating beyond "3" may be restricted from utilizing the map interaction data item. Map interaction data items within a trust threshold beyond the trust rating of the target program may be considered non-relevant to the target program. For example, a user may have an "office" location saved in a source program which is classified as "highly sensitive." In this example, the location of the "office" location may not be shared with a target program having a low trust rating even though location may be relevant to the functionality of the target program (e.g. parking recommendation). In another example, a user may configure a setting in a source program that allows sharing locations the user considers non-sensitive (e.g. the locations of previously visited restaurants), and disallows sharing locations the user considers sensitive (e.g. the location of a hospital visited by the user) with a target program with a low trust rating. In at least one example embodiment, each map interaction data item of the target program interaction data set indicates a trust threshold. For example, each map interaction data item of the target program interaction data set may be associate with trust threshold similar as described regarding FIGS. 5A-5F.

As previously described, a porting module may filter map interaction data items from the target program map interaction data set according to geographical relevance. A map interaction data item may be considered geographically relevant if a geographical region indicated by the map interaction data item at least partially overlaps with the geographical region of the target program. For example, a map interaction data item may indicate a geographical region "Chicago" which is identical to a geographical region "Chicago" for a target program. In circumstances such as these, the geographical regions may be described as fully overlapping. In another example, a map interaction data item may indicate a geographical region "Chicago" which partially overlaps with a geographical region "Illinois" for a target program (e.g., Chicago is a city in the State of Illinois). In another example, a map interaction data item may indicate a geographical region "New York" which fails to at least partially overlap with a geographical region "Chicago" for a target program. Map interaction data items which fail to at least partially overlap with a geographical region of a target program may be considered non-relevant to the target program. In at least one example embodiment, each map interaction data item of the target program interaction data set indicates a geographical region. For example, each map interaction data item of the target program interaction data set may be associated with a geographical region similar as described regarding FIGS. 5A-5F.

In circumstances where a porting module is filtering map interaction data items from a target program map interaction data set according to trust threshold, geographical relevance, and/or the like, the porting module may filter map interaction data items from the target program map interaction data set according the following operations:

Identifying a filter map interaction data set; and
Removing, from the target program map interaction data set, of each map interaction data item that is included in the filter map interaction data set.

A filter map interaction data set may refer to a data set that includes map interaction data items from the target program map interaction data set that indicate a trust threshold that is beyond the trust rating for the target program, map interaction data items from the target program map interaction data set that indicate a geographical region that fails to at least partially correspond with the geographical region of the target program, and/or the like. Map interaction data items within a filter map interaction data set may be considered non-relevant to the target program. In at least one example embodiment, a filter map interaction data set is identified to include each map interaction data item from the target program map interaction data set that indicates a trust threshold that is beyond the trust rating for the target program In at least one example embodiment, a filter map interaction data set is identified to include each map interaction data item from the target program map interaction data set that indicates a trust threshold that is beyond the trust rating for the target program. In at least one example embodiment, each map interaction data item that is included in a filter map interaction data set is removed from the target program map interaction data set.

As previously described, a porting module may perform semantic transformation of map interaction data items. Semantic transformation may refer to one or more steps which replace, modify, and/or the like source program map interaction data items such that the transformed source program map interaction data items more relevant for a target program. For example, semantic transformation may be applied to target program map interaction data items, which were filtered and/or removed because they were determined to be either privacy incompliant or geographically irrelevant for the target program. For example, for map interaction data items $m_{ij}$ considered "non-relevant" for a target program $\alpha_N$, e.g. a café in one city would not be relevant for an interactive mapping program of another city, a porting module may perform steps to determine a "closest/equivalent" replacement marker $m_{Nj}$, e.g. another café with a similar rating, and inserts it in $M_N$. In another example, for interaction data items $p_{ij}$, where e.g. if a target program $a_N$ does not support an interaction type (e.g. zoom at a certain level), the "closest" such level may be determined and saved as a user preference in the target program $P_N$, i.e. added to $P_N$. A porting module may perform semantic transformation of map interaction data items from the target program map interaction data set according the following operations:

Identifying a replacement map interaction data set to include each map interaction data item from a filter map interaction data set that corresponds with an alternative map interaction data item; and
Replacing of each map interaction data item of the target program map interaction data set that is included in the replacement map interaction data set, with an alternative map interaction data item that corresponds with the map interaction data item.

In at least one example embodiment, a replacement map interaction data set includes each map interaction data item from a filter map interaction data set that corresponds with an alternative map interaction data item that indicates a trust threshold that is within the trust rating for the target program. In at least one example embodiment, the replacement map interaction data set includes each map interaction data item from a filter map interaction data set that corresponds with an alternative map interaction data item that indicates a geographical region that at least partially corresponds with the geographical region of the target program. In some circumstances, a filter map interaction data set may comprise map interaction data items that cannot be modified or replaced. For example, a porting module may be unable to identify a "closest/equivalent" map interaction data item for a particular map interaction data item. In circumstances such as these, the porting module may remove, from the target program map interaction data set, of each map interaction data item that is included in the filter map interaction data set, similar as described with respect to filtering of the target program map interaction data set.

As previously described, a porting module may send a target program map interaction data set to a target program. In some circumstances, the porting module, the target program, and at least one source program may be accessible from the same apparatus. For example, the source program, the target program, and the porting module may be installed on the same phone, tablet, computer, and/or the like. The example of FIG. 3A illustrates apparatus 300. In the example of FIG. 3A, a user of apparatus 300 may interact with programs 302 ("App A"), 304 ("App B"), 306 ("App C"), and 310 ("Target App N"). In the example of FIG. 3A, porting module 308 may port map interaction data between programs 302, 304, 306, and 310. For example, porting module may receive source program data items from programs, and may determine a target program data set to send to program 310.

In some circumstances, a source program, a target program, a porting module, and/or the like may be located on separate apparatuses. For example, one or more source programs may be installed on a first apparatus, and a porting module and a target program may be installed on a separate apparatus. In circumstances such as these, it may be desirable for the programs, the porting module, and/or the like to exchange map interaction data items by way of apparatus communication.

FIG. 3B is a diagram illustrating apparatus communication according to at least one example embodiment. In the example of FIG. 3B, apparatus 322 is an electronic apparatus. An electronic apparatus may be an electronic apparatus that a user commonly utilizes during performance of various tasks, activities, and/or the like. For example, the electronic apparatus may be a phone, a tablet, a computer, a laptop, a global positioning system apparatus, and/or the like. In the example of FIG. 3B, apparatus 324 is a separate electronic apparatus. A separate electronic apparatus may be an electronic apparatus that a user often utilizes in conjunction with the electronic apparatus, in proximity to the electronic apparatus, and/or the like. For example, a separate electronic apparatus may be a phone, a tablet, a computer, a laptop, a global positioning system apparatus, and/or the like. Although the aforementioned example describes apparatus 322 and apparatus 324 as distinct types of apparatuses, namely, an electronic apparatus and a separate electronic apparatus, in some circumstances, the apparatuses may both be electronic apparatuses, both be separate electronic apparatuses, and/or the like.

In the example of FIG. 3B, apparatus 322 communicates with apparatus 324 by way of communication channel 332. For example, apparatus 322 may send information to apparatus 324 by way of communication channel 332, apparatus 322 may receive information sent from apparatus 324 by way of communication channel 332, and/or the like. A communication channel, for example, may be a channel utilized for sending and/or receiving of information, data, communications, and/or the like, between two or more apparatuses. It should be understood that, even though the example of FIG. 3B illustrates a direct communication channel between apparatus 322 and apparatus 324, there may be intermediate apparatuses that facilitate communication between apparatus 322 and apparatus 324. For example, there may be one or more routers, hubs, switches, gateways, and/or the like, that are utilized in the communication channels between apparatus 322 and apparatus 324. In addition, there may be other separate apparatuses that apparatus 322 and/or apparatus 324 are in communication with. For example, apparatus 322 and/or apparatus 324 may be in communication with another apparatus, a separate apparatus, a different apparatus, and/or the like.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, an apparatus may be a phone, a tablet, a computer, a display, a monitor, a head mounted display, a see through display, a wearable apparatus, a head worn apparatus, a hand worn apparatus, an electronic apparatus, a peripheral apparatus, a host apparatus, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 3B, apparatus 322 communicates with apparatus 324 by way of a communication channel 332. In the example of FIG. 3B, communication channel 332 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 3B, apparatus 322 communicates with apparatus 324 by way of communication channel 332. In the example of FIG. 3B, communication channel 332 may be a local area network communication channel, a wide area network communication channel, an internet communication channel, a cellular communication channel, and/or the like.

In some circumstances, a source program, a target program, a porting module, map interaction data, and/or the like may be located on multiple separate apparatuses. For example, one or more source programs may be installed on different apparatuses, a porting module may reside on a server hosted by a cloud service provider, and a target program may be installed on a separate apparatus.

The example of FIG. 3C illustrates apparatuses 340 ("User device 1"), 350 ("User device 2") and 370 ("User device 3"). In the example of FIG. 3C, a user of apparatus 340 may interact with program 342 ("Mapping App A"), a user of apparatus 350 may interact with program 352 ("Mapping App B"), and a user of apparatus 370 may interact with program 372 ("Mapping App N"). In the example of FIG. 3C, porting module 362 may port map interaction data between programs 342, 352, and 372 by way of cloud service architecture 360 ("Mapping data cloud"). For example, porting module 362 may reside on a server within cloud service architecture 360, may receive source program data items from programs 342 and 352, and may determine a target program data set to send to program 372 by way of apparatus communication similar as described regarding FIG. 3B.

Figure 4A:
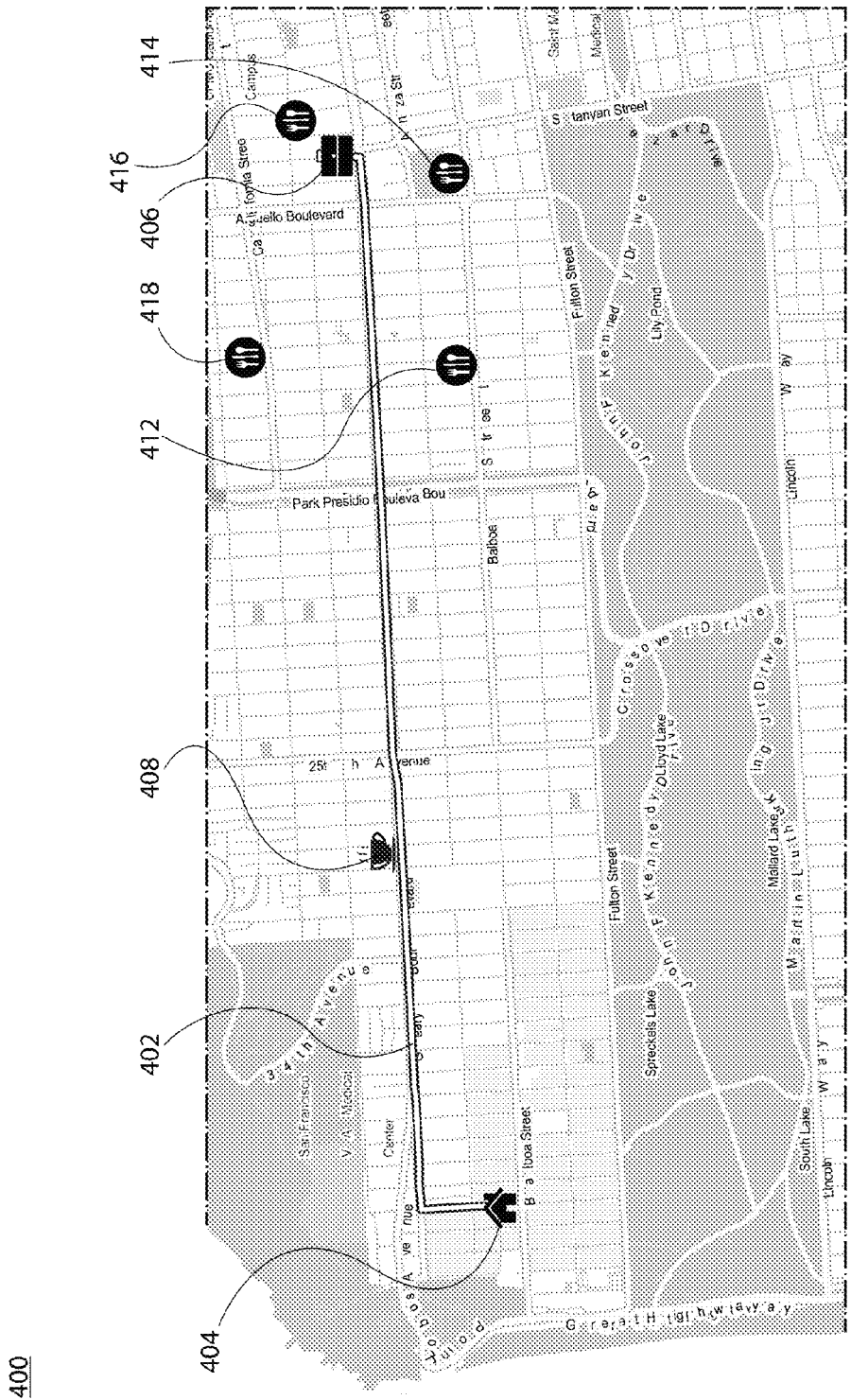
FIGS. 4A-4C are diagrams illustrating interactive mapping programs according to at least one example embodiment.
Figure 4B:
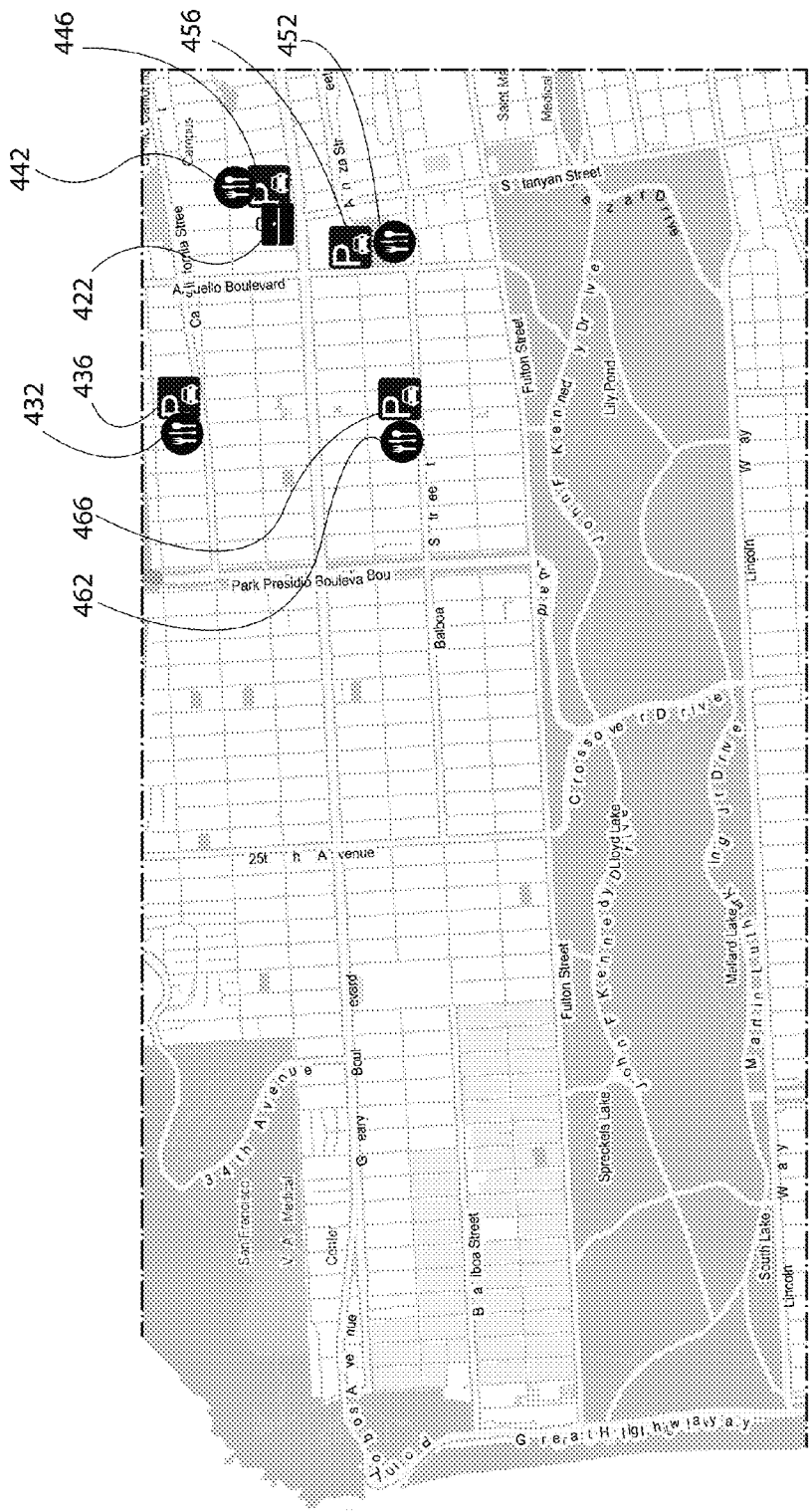
Figure 4C:
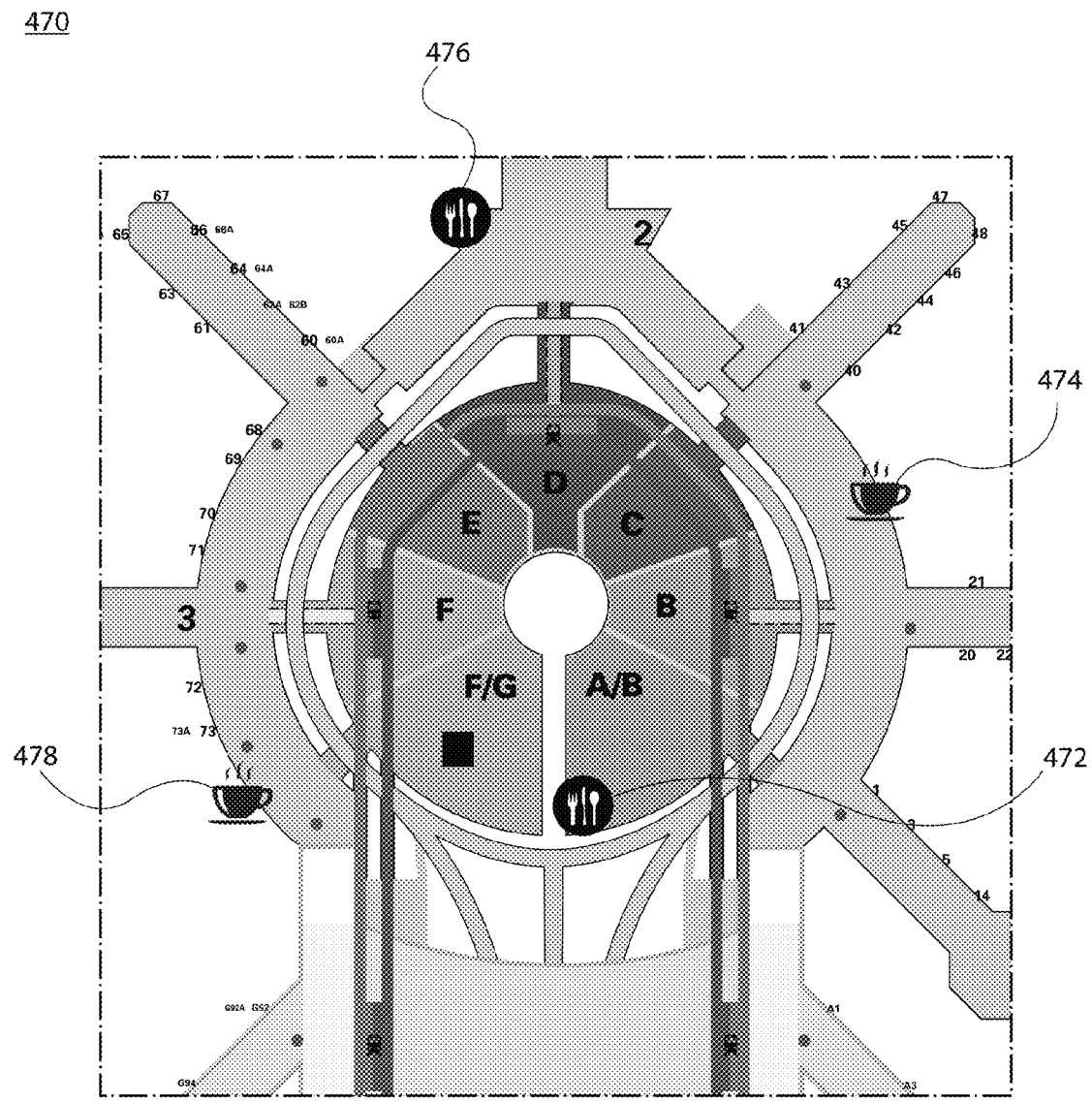

FIGS. 4A-4C are diagrams illustrating interactive mapping programs according to at least one example embodiment. The examples of FIGS. 4A-4C are merely examples and do not limit the scope of the claims. For example, the interactive mapping programs may vary, the information displayed may vary, the map interaction data may vary, and/or the like.

As previously described, a porting module may send map interaction data from a source program to a target program. For example, a porting module may send map interaction data from a first source program related to visual information representation 200 of FIG. 2A and map interaction data from a second source program related to visual information representation 210 of FIG. 2B to a target program.

The example of FIG. 4A illustrates visual information representation 400. Visual information representation 400 may be representative of information received, generated, displayed, and/or the like from a program, such as an interactive mapping program, a navigation program, and/or the like. In the example of FIG. 4A, visual information representation 400 comprises visual representations of various roads, as well as visual indicators 402, 404, 406, 408, 412, 414, 416, and 418. It can be seen that in the example of FIG. 4A, the location represented by visual information representation 400 is similar to the location represented by visual information representation 200 of FIG. 2A, visual information representation 210 of FIG. 2B, and visual information representation 220 of FIG. 2C.

In the example of FIG. 4A, visual indicator 402 is representative of a route between locations represented by visual indicators 404 and 406. For example, visual indicator 404 may be representative of a location of a user's home, and visual indicator 406 may be representative of a location of a user's office. In the example of FIG. 4A, visual indicator 408 is representative of a location of a point of interest along the route represented by visual indicator 402. For example, visual indicator 408 may be representative of a coffee shop. In this manner, a user may view visual information representation 400 and determine that a route corresponding with visual indicator 402 exists between the user's home and office, and that a coffee shop lies along the route at the location corresponding with visual indicator 408. In the example of FIG. 4A, visual indicators 412, 414, 416, and 418 are representative of locations of a points of interest near a location. For example, visual indicators 412, 414, 416, and 418 may be representative of restaurants near the location represented by visual indicator 406. In this manner, a user may view visual information representation 400 and determine that restaurants are located at locations corresponding with visual indicators 412, 414, 416, and 418. It can be seen that in the example of FIG. 4A, visual indicators 402, 404, 406, 408, 412, 414, 416, and 418 may correspond with visual indicators 202, 204, 206, and 208 of FIG. 2A and visual indicators 212, 214, 216, and 218 of FIG. 2B. In this manner, a program displaying visual information representation 400 may have received map interaction data items associated with visual indicators 402, 404, 406, 408, 412, 414, 416, and 418 from a porting module that received the map interaction data items from one or more source programs associated with visual indicators 202, 204, 206, and 208 of FIG. 2A and visual indicators 212, 214, 216, and 218 of FIG. 2B.

As previously described, a porting module may filter map interaction data from a target program map interaction data set before sending the target map interaction data set to the target program. For example, a porting module may determine a target map interaction data set from a first source program related to visual information representation 200 of FIG. 2A, map interaction data from a second source program related to visual information representation 210 of FIG. 2B, and map interaction data from a third source program related to visual information representation 220 of FIG. 2C to a target program. The porting module may filter some of the data from the determined target map interaction data set before sending the target map interaction data set to a target program.

The example of FIG. 4B illustrates visual information representation 410. Visual information representation information 410 may be representative of information received, generated, displayed, and/or the like from a program, such as an interactive mapping program, a navigation program, and/or the like. In the example of FIG. 4B, visual information representation 410 comprises visual representations of various roads, as well as visual indicators 422, 432, 436, 442, 446, 452, 456, 462, and 466. It can be seen that in the example of FIG. 4B, the location represented by visual information representation 410 is similar to the location represented by visual information representation 200 of FIG. 2A, visual information representation 210 of FIG. 2B, visual information representation 220 of FIG. 2C, and visual information representation 400 of FIG. 4A.

In the example of FIG. 4B, visual indicator 422 is representative of a location. For example, visual indicator 422 may be representative of a location of a user's office. In the example of FIG. 4B, visual indicators 432, 442, 452, and 462 are representative of locations of points of interest near a location. For example, visual indicators 432, 442, 452, and 462 may be representative of restaurants near the location represented by visual indicator 422. In this manner, a user may view visual information representation 410 and determine that restaurants are located at locations corresponding with visual indicators 432, 442, 452, and 462. In the example of FIG. 4B, visual indicators 436, 446, 456, and 466 are representative of locations of points of interest near a location. For example, visual indicators 436, 446, 456, and 466 may be representative of parking lots near the locations represented by visual indicators 432, 442, 452, and 462. In this manner, a user may view visual information representation 410 and determine that parking lots are located at locations corresponding with visual indicators 436, 446, 456, and 466. It can be seen that in the example of FIG. 4B, visual indicators 422, 432, 436, 442, 446, 452, 456, 462, and 466 may correspond with visual indicator 206 of FIG. 2A, visual indicators 212, 214, 216, and 218 of FIG. 2B, and visual indicators 222, 224, 226, and 228 of FIG. 2C. It can be seen that in the example of FIG. 4B, visual information representation 410 fails to comprise visual indicators that correspond with visual indicators 202, 204, and 208 of FIG. 2A. In this manner, a program displaying visual information representation 400 may have received a target map interaction data set comprising map interaction data items associated with visual indicators 422, 432, 436, 442, 446, 452, 456, 462, and 466 from a porting module that received the map interaction data items from one or more source programs associated with visual indicators 202, 204, 206, and 208 of FIG. 2A and visual indicators 212, 214, 216, and 218 of FIG. 2B, and visual indicators 222, 224, 226, and 228 of FIG. 2C, and the porting module may have filtered map interaction data items related to visual indicators 202, 204, and 208 from the target map interaction data set prior to sending the target map interaction data set to a program associated with visual information representation 410.

As previously described, in some circumstances, a map interaction data item may indicate user preferences. For example, a map information data item may indicate a user prefers a particular visual indicator to be displayed associated with a location. The example of FIG. 4C illustrates visual information representation 470. Visual information representation 470 may be representative of information received, generated, displayed, and/or the like from a program, such as an interactive mapping program, a navigation program, and/or the like. In the example of FIG. 4C, visual information representation 470 comprises visual representations of various passages within a building (e.g. an airport), as well as visual indicators 472, 474, 476, and 478. It can be seen that in the example of FIG. 4C, the location represented by visual information representation 470 is similar to the location represented by visual information representation 230 of FIG. 2D.

In the example of FIG. 4C, visual indicators 472, 474, 476, and 478 are representative of locations of a points of interest near within the passageways represented by visual information representation 470. For example, visual indicators 472 and 476 may be representative of the locations of restaurants, and visual indicators 474 and 478 may be representative of the locations of coffee shops. In this manner, a user may view visual information representation 470 and determine restaurants are located at locations corresponding with visual indicators 472 and 476, and that coffee shops are located at locations corresponding with visual indicators 474, and 478. It can be seen that the location of visual indicators 472, 474, 476, and 478 may correspond with the location of visual indicators 232, 234, 236, and 238 of FIG. 2D. It can be seen that visual indicators 472 and 476 of FIG. 2D and that visual indicators 212, 214, 216, and 218 of FIG. 2B have a similar appearance. Similarly, it can be seen that visual indicators 234 and 238 of FIG. 2D and visual indicator 208 of FIG. 2A have a similar appearance. In this manner, a program associated with visual information representation 470 may have received a map interaction data set from a porting module comprising map information data items that indicate that a user prefers the appearance of visual indicators 472, 474, 476, and 478, and the map interaction data items may indicate that the locations represented by visual indicators 472, 474, 476, and 478 are the locations represented by visual indicators 232, 234, 236, and 238 of FIG. 2D.

FIGS. 5A-5F are diagrams illustrating map interaction data sets according to at least one example embodiment. The examples of FIGS. 5A-5F are merely examples and do not limit the scope of the claims. For example, the type of map interaction data may vary, the amount of map interaction data may vary, the number of map interaction data sets may vary, and/or the like.

Figure 5A:
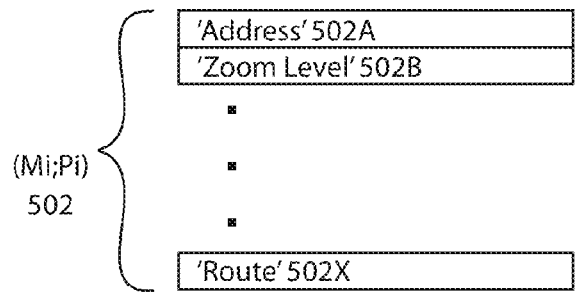

As previously described, in some circumstances, a plurality of map interaction data items may be organized into map interaction data set. The example of FIG. 5A illustrates map interaction data set 502 (Set $M_i$; $P_i$). In the example of FIG. 5A, map interaction data set 502 comprises a set of map data interaction items 502A-502X (502C-502W not shown). The map interaction data items in the example of FIG. 5A may be similar as described regarding FIGS. 2A-2D, 3A-3C, 4A-4C, and/or the like. For example, map interaction data item 502A ("Address") may be a map data item, and map interaction data item 502B ("Zoom level") may be a map interaction item. In this manner, map interaction data set 502 may comprise a map data set and a map interaction set.

Figure 5B:
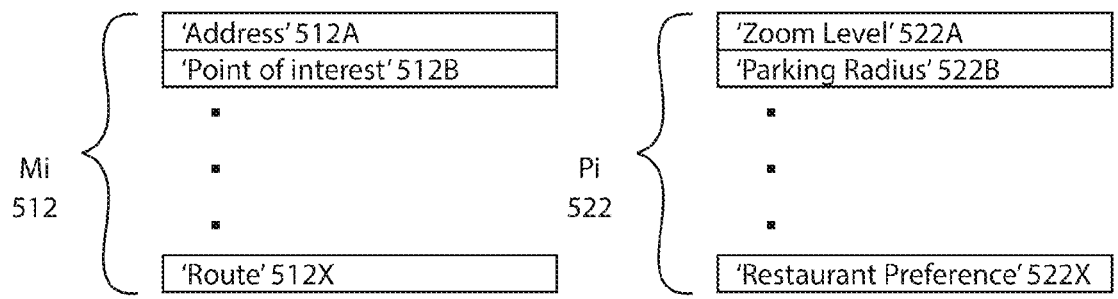

As previously described, in some circumstances, a plurality of map data items may be organized into map data set, and a plurality of map interaction items may be organized into map interaction set. The example of FIG. 5B illustrates map data set 512 (set $M_i$), and map interaction set 522 (set $P_i$). In the example of FIG. 5B, map data set 512 comprises a set of map data items 512A-512X (512C-512W not shown). In the example of FIG. 5B, map interaction set 522 comprises a set of map interaction items 522A-522X (522C-522W not shown). The map data items and map interaction items in the example of FIG. 5B may be similar as described regarding FIGS. 2A-2D, 3A-3C, 4A-4C, and/or the like.

Figure 5C:
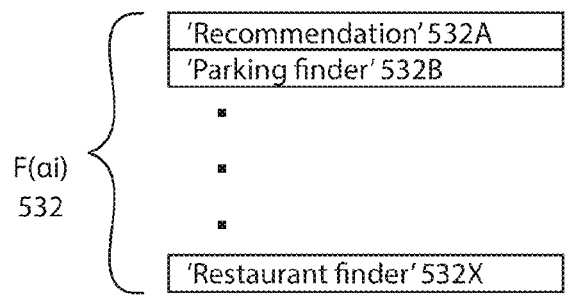

As previously described, in some circumstances, a porting module may determine a map function set for a program. The example of FIG. 5C illustrates map function set 532 (Set $F(a_i)$). In the example of FIG. 5C, map function set 532 denotes the functionality mapping of program $a_i$. In the example of FIG. 5C, map function set 532 comprises a set of map functions 532A-532X (532C-532W not shown). The map functions in the example of FIG. 5C may be similar as described regarding FIGS. 2A-2D, 3A-3C, 4A-4C, and/or the like.

In some circumstances, a particular map interaction data item may be associated with a particular map interaction data set. For example, a map data item may be associated with a map data set, and a map interaction item may be associated with a map interaction set. FIG. 5D is a diagram showing map interaction data item and map interaction data set association according to at least one example embodiment. The example of FIG. 5D illustrates an embodiment of a map interaction data structure. The map interaction data structure of FIG. 5D comprises information indicative of associations between map interaction data item 544A and map interaction data set 544B, between map interaction data item 546A and map interaction data set 564B, and between map interaction data item 548A and map interaction data set 548B. For example, map interaction data set 544B may be a particular map interaction data set, and map interaction data item 544A may be a map interaction data item within map interaction data set 544B. As such, an association between map interaction data item 544A and map interaction data set 544B has been established and stored in the map interaction data structure data structure of FIG. 5D. In the example of FIG. 5D, the data structure of FIG. 5D may be stored on a user controlled apparatus, on a server controlled by a map information service provider, and/or the like.

In some circumstances, a particular map interaction data item may be associated with a trust threshold. FIG. 5E is a diagram showing map interaction data item and trust threshold association according to at least one example embodiment. The example of FIG. 5E illustrates an embodiment of a map interaction data trust threshold data structure. The map interaction data trust threshold data structure of FIG. 5E comprises information indicative of associations between map interaction data item 564A and trust threshold 564B, between map interaction data item 566A and trust threshold 566B, and between map interaction data item 568A and trust threshold 568B. For example, map interaction data item 564A may be a particular map interaction data item, and trust threshold 564B may indicate a particular trust threshold associated with map interaction data item 564A. As such, an association between map interaction data item 564A and trust threshold 564B has been established and stored in the map interaction data trust threshold data structure of FIG. 5E. In the example of FIG. 5E, the data structure of FIG. 5E may be stored on a user controlled apparatus, on a server controlled by a map information service provider, and/or the like.

In some circumstances, a particular map interaction data item may be associated with a geographical region. FIG. 5F is a diagram showing map interaction data item and geographical association according to at least one example embodiment. The example of FIG. 5F illustrates an embodiment of a map interaction data geographical region data structure. The map interaction data geographical region data structure of FIG. 5F comprises information indicative of associations between map interaction data item 574A and geographical region 574B, between map interaction data item 576A and geographical region 576B, and between map interaction data item 578A and geographical region 578B. For example, map interaction data item 574A may be a particular map interaction data item, and geographical region 574B may indicate a particular geographical region associated with map interaction data item 574A. As such, an association between map interaction data item 574A and geographical region 574B has been established and stored in the map interaction data geographical region data structure of FIG. 5F. In the example of FIG. 5F, the data structure of FIG. 5F may be stored on a user controlled apparatus, on a server controlled by a map information service provider, and/or the like.

Even though the examples of FIGS. 5A-5F depict sets and data structures having a particular format, it should be understood that the sets and data structures of FIGS. 5A-5F may have any format. For example, the sets and data structures of FIGS. 5A-5F may be one or more database entries, linked lists, tables, arrays, matrices, and/or the like.

Figure 6:
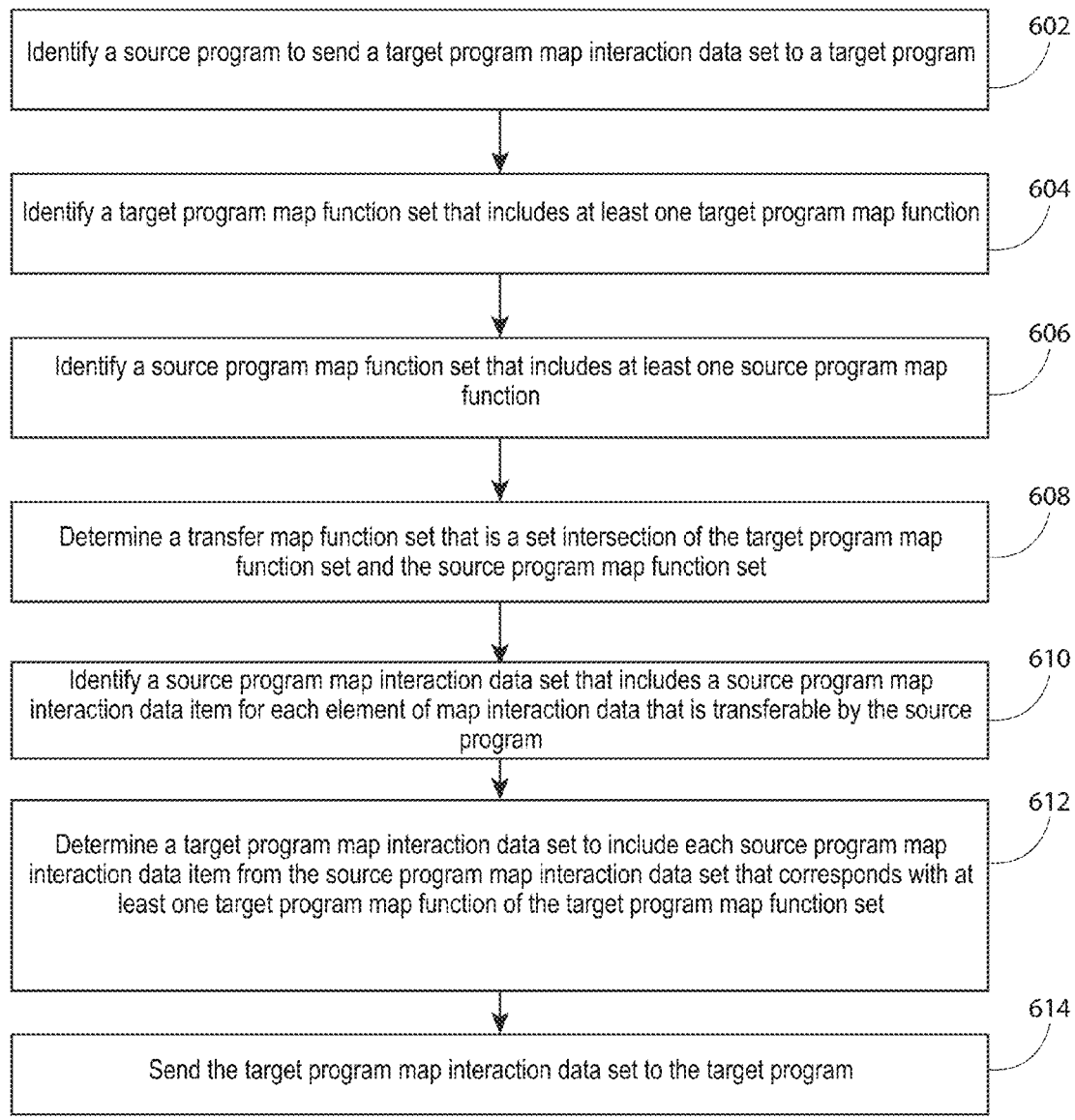
FIG. 6 is a flow diagram illustrating activities associated with sending of map interaction data to a program according to at least one example embodiment.

FIG. 6 is a flow diagram illustrating activities associated with sending of map interaction data to a program according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

As previously described, in some circumstances it may be desirable for a program to send map interaction data to another program.

At block 602, the apparatus identifies a source program to send a target program map interaction data set to a target program. The identification, the source program, the target program, and the target program map interaction data set may be similar as described regarding FIGS. 2A-2D, FIGS. 3A-3C, FIGS. 4A-4C, and FIGS. 5A-5F.

At block 604, the apparatus identifies a target program map function set that includes at least one target program map function. The identification, the target program map function set, and the target program map function may be similar as described regarding FIGS. 2A-2D, FIGS. 3A-3C, FIGS. 4A-4C, and FIGS. 5A-5F.

At block 606, the apparatus identifies a source program map function set that includes at least one source program map function. The identification, the source program map function set, and the source program map function may be similar as described regarding FIGS. 2A-2D, FIGS. 3A-3C, FIGS. 4A-4C, and FIGS. 5A-5F.

At block 608, the apparatus determines a transfer map function set that is a set intersection of the target program map function set and the source program map function set. The determination, the transfer map function set, and the intersection may be similar as described regarding FIGS. 2A-2D, FIGS. 3A-3C, FIGS. 4A-4C, and FIGS. 5A-5F.

At block 610, the apparatus identifies a source program map interaction data set that includes a source program map interaction data item for each element of map interaction data that is transferable by the source program. The identification, the source program map interaction data set, the source map interaction data item, and the element of map interaction data may be similar as described regarding FIGS. 2A-2D, FIGS. 3A-3C, FIGS. 4A-4C, and FIGS. 5A-5F.

At block 612, the apparatus determines a target program map interaction data set to include each source program map interaction data item from the source program map interaction data set that corresponds with at least one target program map function of the target program map function set. The determination, target program map interaction data set, the target program map function, and the correspondence may be similar as described regarding FIGS. 2A-2D, FIGS. 3A-3C, FIGS. 4A-4C, and FIGS. 5A-5F.

At block 614, the apparatus sends the target program map interaction data set to the target program. The sending may be similar as described regarding FIGS. 3A-3C.

Figure 7:
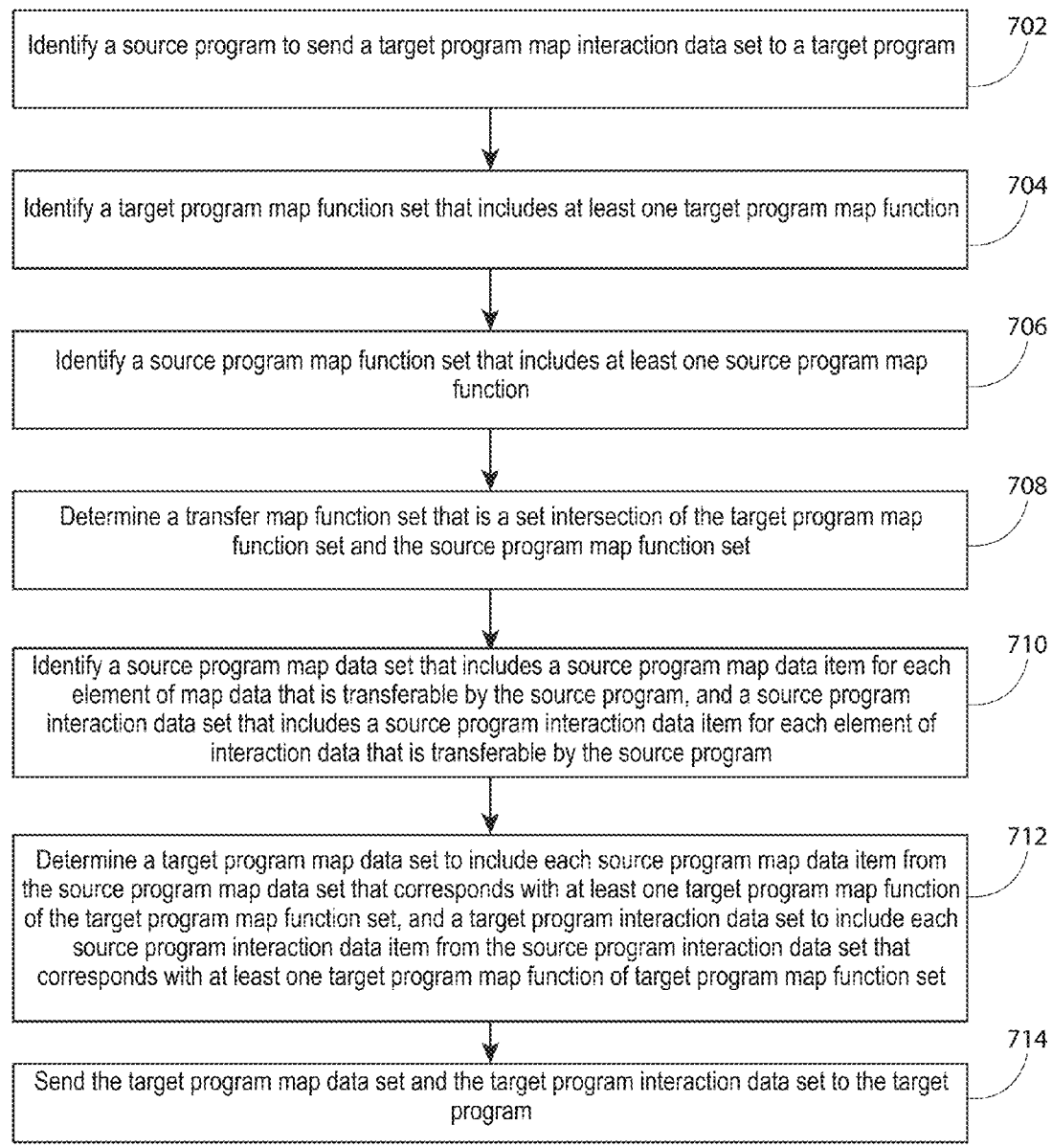
FIG. 7 is a flow diagram illustrating activities associated with identification of a source program map data set according to at least one example embodiment.

FIG. 7 is a flow diagram illustrating activities associated with identification of a source program map data set according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As previously described, in some circumstances it may be desirable for a program to send map data and/or interaction data to another program.

At block 702, the apparatus identifies a source program to send a target program map interaction data set to a target program, similarly as described regarding block 602 of FIG. 6. At block 704, the apparatus identifies a target program map function set that includes at least one target program map function, similarly as described regarding block 604 of FIG. 6. At block 706, the apparatus identifies a source program map function set that includes at least one source program map function, similarly as described regarding block 606 of FIG. 6. At block 708, the apparatus determines a transfer map function set that is a set intersection of the target program map function set and the source program map function set, similarly as described regarding block 608 of FIG. 6.

At block 710, the apparatus identifies a source program map data set that includes a source program map data item for each element of map data that is transferable by the source program, and a source program interaction data set that includes a source program interaction data item for each element of interaction data that is transferable by the source program. The identification, the source program map data set, the source program map data item, the element of map data, the source program interaction data set, the source program interaction data item, and the element of interaction data may be similar as described regarding FIGS. 2A-2D, FIGS. 3A-3C, FIGS. 4A-4C, and FIGS. 5A-5F.

At block 712, the apparatus determines a target program map data set to include each source program map data item from the source program map data set that corresponds with at least one target program map function of the target program map function set, and a target program interaction data set to include each source program interaction data item from the source program interaction data set that corresponds with at least one target program map function of target program map function set. The determination, the target program map data set, the target program interaction data set, and the correspondence may be similar as described regarding FIGS. 2A-2D, FIGS. 3A-3C, FIGS. 4A-4C, and FIGS. 5A-5F.

At block 714, the apparatus sends the target program map data set and the target program interaction data set to the target program. The sending may be similar as described regarding FIGS. 3A-3C.

Figure 8:
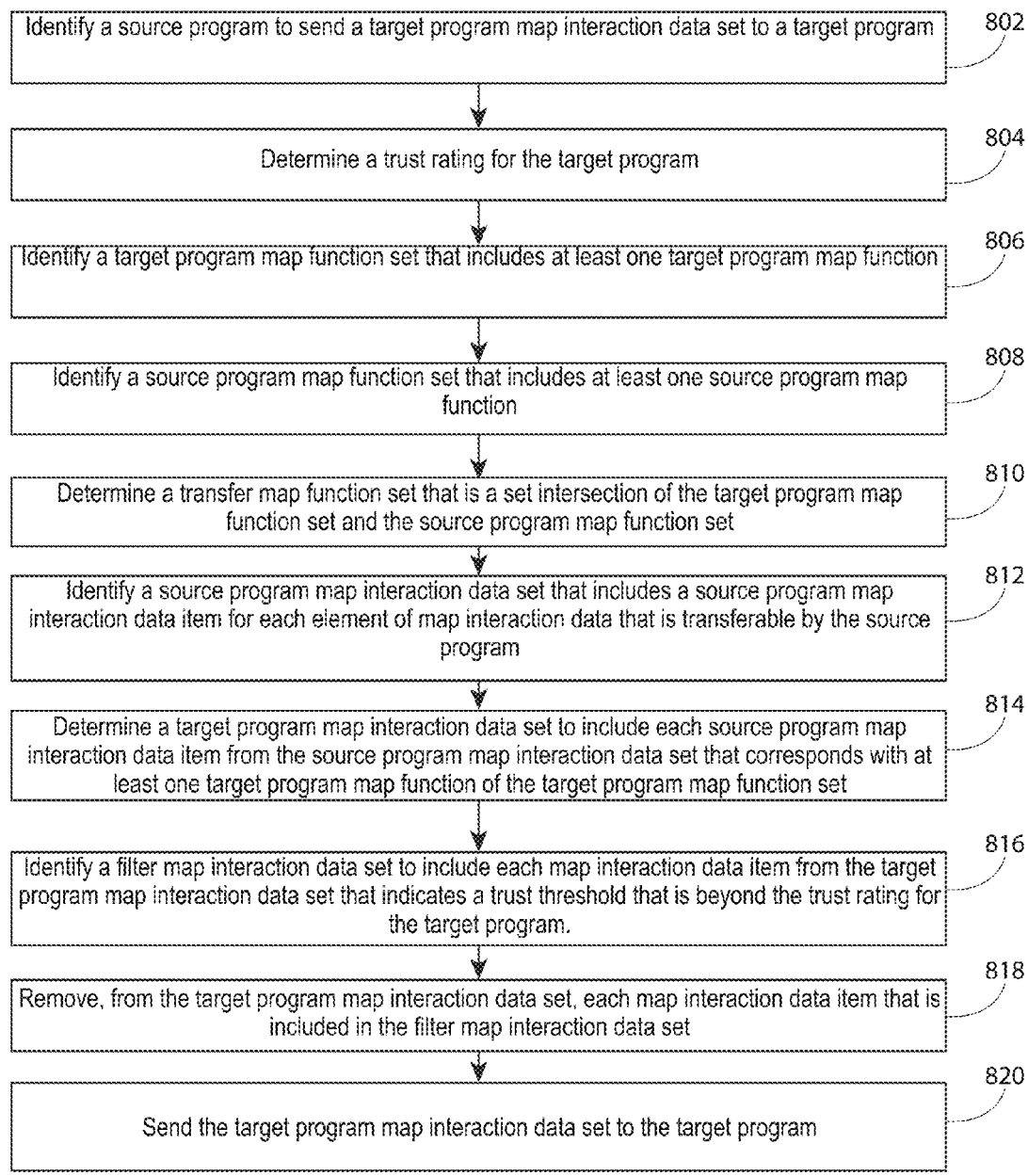
FIG. 8 is a flow diagram illustrating activities associated with determination of a trust rating according to at least one example embodiment.

FIG. 8 is a flow diagram illustrating activities associated with determination of a trust rating according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously described, in some circumstances a target program may have a trust rating. In circumstances such as these, it may be desirable to filter map interaction data items based, at least in part, on the trust rating.

At block 802, the apparatus identifies a source program to send a target program map interaction data set to a target program, similarly as described regarding block 602 of FIG. 6. At block 804, the apparatus determines a trust rating for the target program. The determination and the trust rating may be similar as described regarding FIGS. 2A-2D, FIGS. 3A-3C, FIGS. 4A-4C, and FIGS. 5A-5F.

At block 806, the apparatus identifies a target program map function set that includes at least one target program map function, similarly as described regarding block 604 of FIG. 6. At block 808, the apparatus identifies a source program map function set that includes at least one source program map function, similarly as described regarding block 606 of FIG. 6. At block 810, the apparatus determines a transfer map function set that is a set intersection of the target program map function set and the source program map function set, similarly as described regarding block 608 of FIG. 6. At block 812, the apparatus identifies a source program map interaction data set that includes a source program map interaction data item for each element of map interaction data that is transferable by the source program, similarly as described regarding block 610 of FIG. 6. At block 814, the apparatus determines a target program map interaction data set to include each source program map interaction data item from the source program map interaction data set that corresponds with at least one target program map function of the target program map function set, similarly as described regarding block 612 of FIG. 6.

At block 816, the apparatus identifies a filter map interaction data set to include each map interaction data item from the target program map interaction data set that indicates a trust threshold that is beyond the trust rating for the target program. The identification, the filter map interaction data set, and the trust threshold be similar as described regarding FIGS. 2A-2D, FIGS. 3A-3C, FIGS. 4A-4C, and FIGS. 5A-5F.

At block 818, the apparatus removes, from the target program map interaction data set, of each map interaction data item that is included in the filter map interaction data set. The removal may be similar as described regarding FIGS. 3A-3C and FIGS. 5A-5F. At block 820, the apparatus sends the target program map interaction data set to the target program, similarly as described regarding block 614 of FIG. 6.

Figure 9:
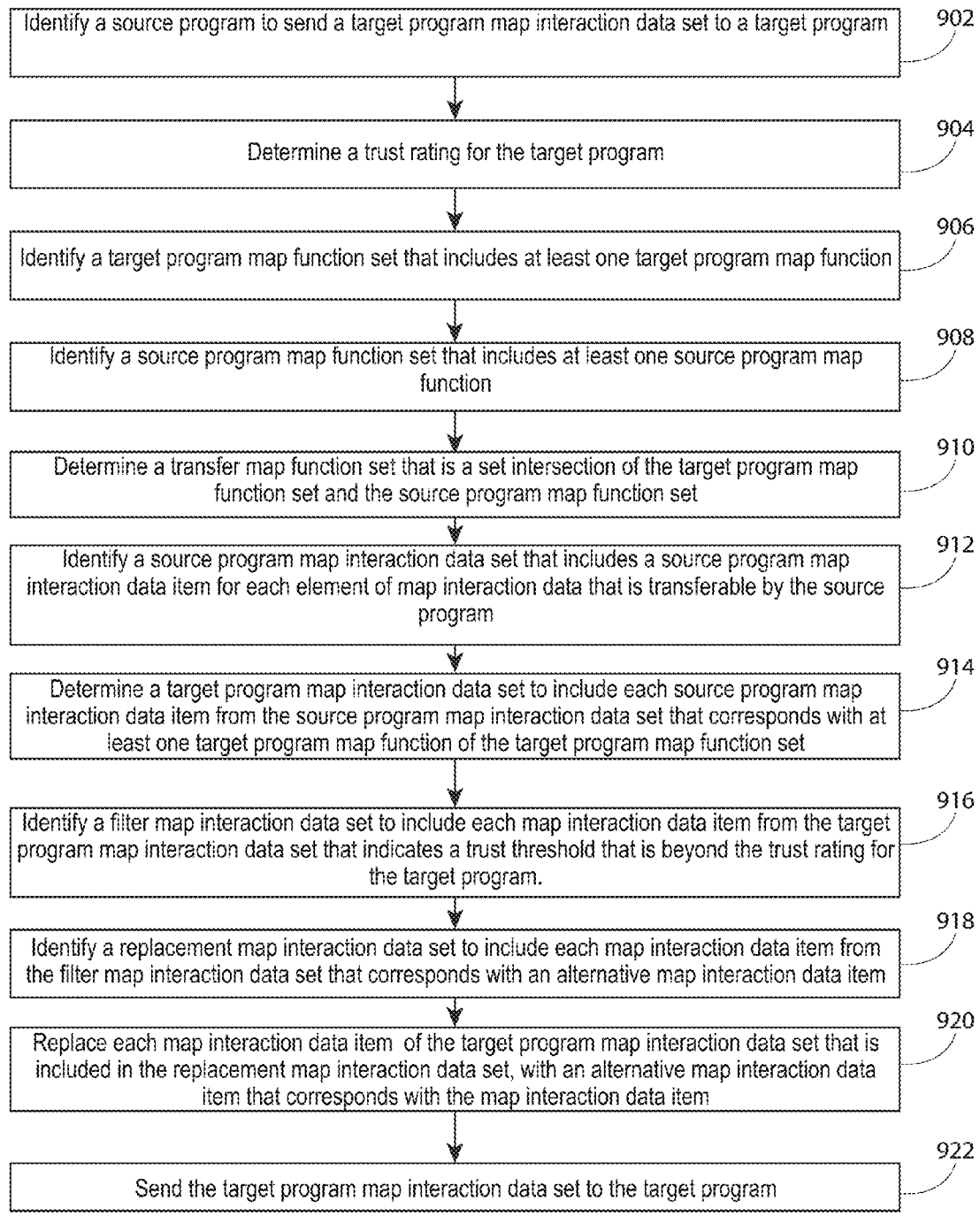
FIG. 9 is a flow diagram illustrating activities associated with identification of a replacement map interaction data set according to at least one example embodiment.

FIG. 9 is a flow diagram illustrating activities associated with identification of a replacement map interaction data set according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, in some circumstances, it may be desirable to filter map interaction data items based, at least in part, on a trust rating. In circumstances such as these, it may be desirable to replace the filtered map interaction data items with alternative map interaction data items.

At block 902, the apparatus identifies a source program to send a target program map interaction data set to a target program, similarly as described regarding block 602 of FIG. 6. At block 904, the apparatus determines a trust rating for the target program, similarly as described regarding block 804 of FIG. 8. At block 906, the apparatus identifies a target program map function set that includes at least one target program map function, similarly as described regarding block 604 of FIG. 6. At block 908, the apparatus identifies a source program map function set that includes at least one source program map function, similarly as described regarding block 606 of FIG. 6. At block 910, the apparatus determines a transfer map function set that is a set intersection of the target program map function set and the source program map function set, similarly as described regarding block 608 of FIG. 6. At block 912, the apparatus identifies a source program map interaction data set that includes a source program map interaction data item for each element of map interaction data that is transferable by the source program, similarly as described regarding block 610 of FIG. 6. At block 914, the apparatus determines a target program map interaction data set to include each source program map interaction data item from the source program map interaction data set that corresponds with at least one target program map function of the target program map function set, similarly as described regarding block 612 of FIG. 6. At block 916, the apparatus identifies a filter map interaction data set to include each map interaction data item from the target program map interaction data set that indicates a trust threshold that is beyond the trust rating for the target program, similarly as described regarding block 816 of FIG. 8.

At block 918, the apparatus identifies a replacement map interaction data set to include each map interaction data item from the filter map interaction data set that corresponds with an alternative map interaction data item. The replacement map interaction data set, the map interaction data item, the correspondence, and the alternative map interaction data item may be similar as described regarding FIGS. 2A-2D, FIGS. 3A-3C, FIGS. 4A-4C, and FIGS. 5A-5F.

At block 920, the apparatus replaces each map interaction data item of the target program map interaction data set that is included in the replacement map interaction data set, with an alternative map interaction data item that corresponds with the map interaction data item. The replacement and the correspondence may be similar as described regarding FIGS. 3A-3C and FIGS. 5A-5F. At block 922, the apparatus sends the target program map interaction data set to the target program, similarly as described regarding block 614 of FIG. 6.

Figure 10:
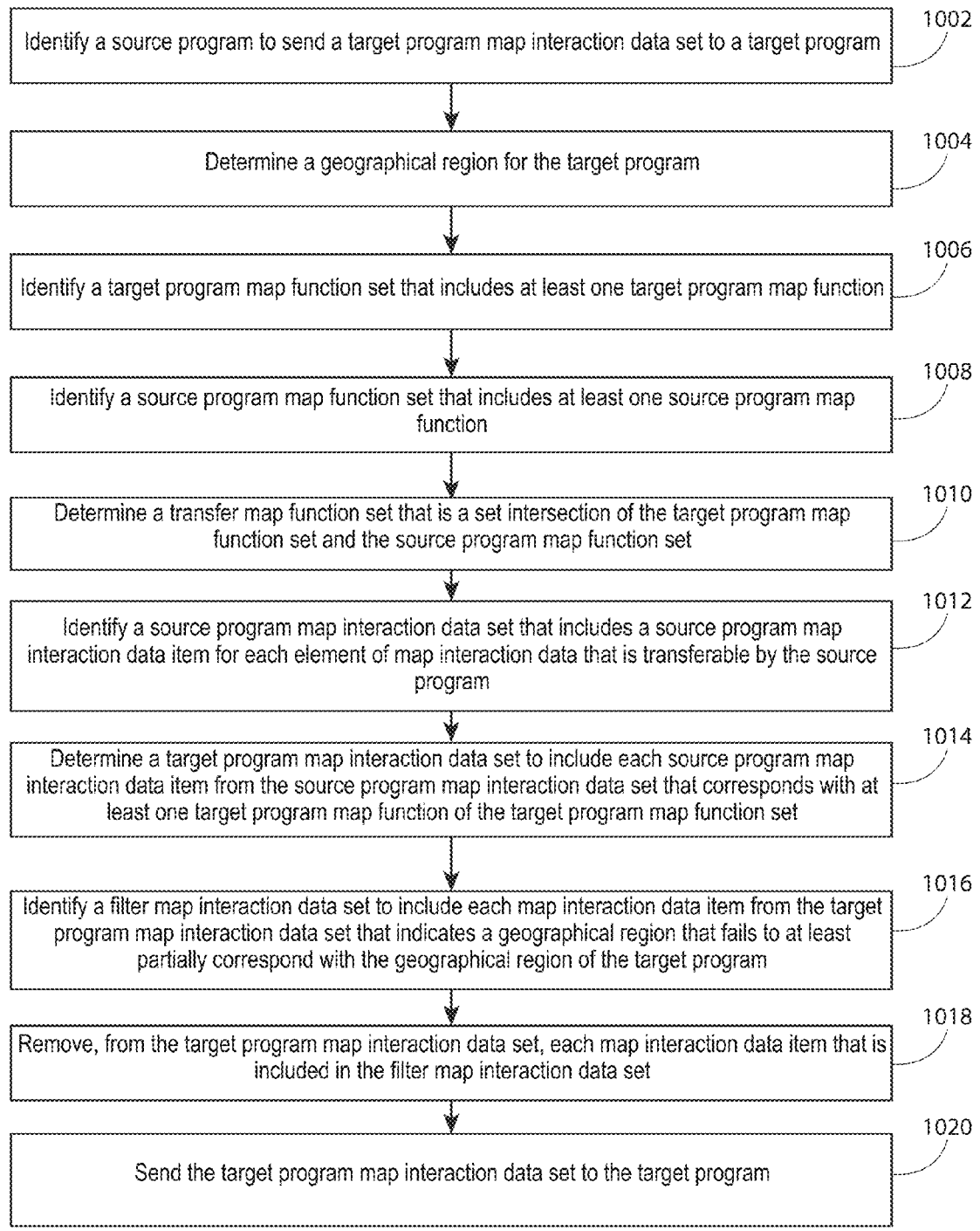
FIG. 10 is a flow diagram illustrating activities associated with determination of a geographical region according to at least one example embodiment.

FIG. 10 is a flow diagram illustrating activities associated with determination of a geographical region according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously described, in some circumstances a target program may have a geographical region. In circumstances such as these, it may be desirable to filter map interaction data items based, at least in part, on the geographical region.

At block 1002, the apparatus identifies a source program to send a target program map interaction data set to a target program, similarly as described regarding block 602 of FIG. 6. At block 1004, the apparatus the apparatus determines a geographical region for the target program. The determination and the geographical region may be similar as described regarding FIGS. 2A-2D, FIGS. 3A-3C, FIGS. 4A-4C, and FIGS. 5A-5F.

At block 1006, the apparatus identifies a target program map function set that includes at least one target program map function, similarly as described regarding block 604 of FIG. 6. At block 1008, the apparatus identifies a source program map function set that includes at least one source program map function, similarly as described regarding block 606 of FIG. 6. At block 1010, the apparatus determines a transfer map function set that is a set intersection of the target program map function set and the source program map function set, similarly as described regarding block 608 of FIG. 6. At block 1012, the apparatus identifies a source program map interaction data set that includes a source program map interaction data item for each element of map interaction data that is transferable by the source program, similarly as described regarding block 610 of FIG. 6. At block 1014, the apparatus determines a target program map interaction data set to include each source program map interaction data item from the source program map interaction data set that corresponds with at least one target program map function of the target program map function set, similarly as described regarding block 612 of FIG. 6.

At block 1016, the apparatus identifies a filter map interaction data set to include each map interaction data item from the target program map interaction data set that indicates a geographical region that fails to at least partially correspond with the geographical region of the target program. The identification, the filter map interaction data set, the geographical region, and the correspondence may be similar as described regarding FIGS. 2A-2D, FIGS. 3A-3C, FIGS. 4A-4C, and FIGS. 5A-5F.

At block 1018, the apparatus the apparatus removes, from the target program map interaction data set, of each map interaction data item that is included in the filter map interaction data set. The removal may be similar as described regarding FIGS. 3A-3C and FIGS. 5A-5F. At block 1020, the apparatus sends the target program map interaction data set to the target program, similarly as described regarding block 614 of FIG. 6.

Figure 11:
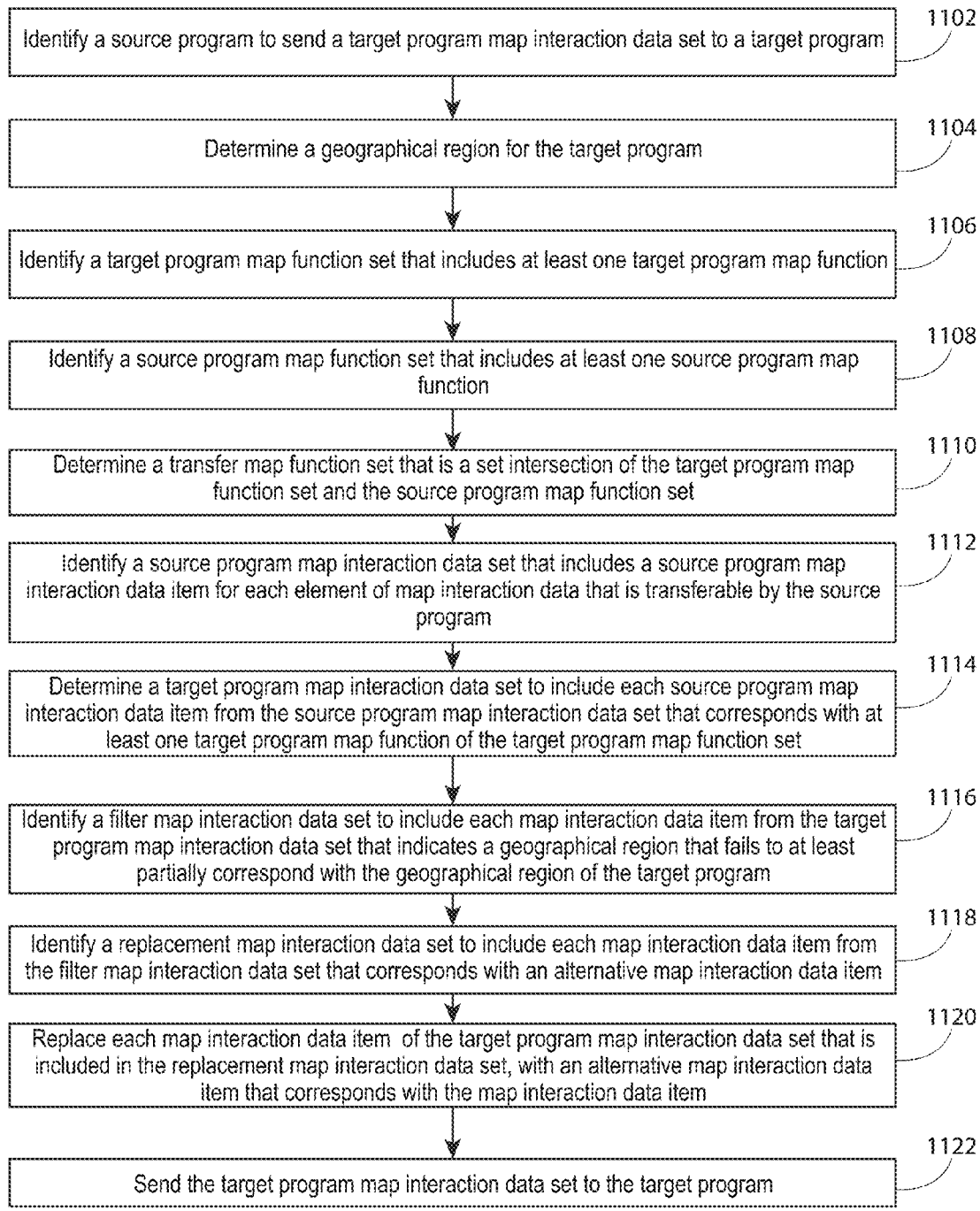
FIG. 11 is a flow diagram illustrating activities associated with identification of a replacement map interaction data set according to at least one example embodiment.

FIG. 11 is a flow diagram illustrating activities associated with identification of a replacement map interaction data set according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As previously described, in some circumstances, it may be desirable to filter map interaction data items based, at least in part, on a geographical region. In circumstances such as these, it may be desirable to replace the filtered map interaction data items with alternative map interaction data items.

At block 1102, the apparatus identifies a source program to send a target program map interaction data set to a target program, similarly as described regarding block 602 of FIG. 6. At block 1104, the apparatus the apparatus the apparatus determines a geographical region for the target program, similarly as described regarding block 1004 of FIG. 10. At block 1106, the apparatus identifies a target program map function set that includes at least one target program map function, similarly as described regarding block 604 of FIG. 6. At block 1108, the apparatus identifies a source program map function set that includes at least one source program map function, similarly as described regarding block 606 of FIG. 6. At block 1110, the apparatus determines a transfer map function set that is a set intersection of the target program map function set and the source program map function set, similarly as described regarding block 608 of FIG. 6. At block 1112, the apparatus identifies a source program map interaction data set that includes a source program map interaction data item for each element of map interaction data that is transferable by the source program, similarly as described regarding block 610 of FIG. 6. At block 1114, the apparatus determines a target program map interaction data set to include each source program map interaction data item from the source program map interaction data set that corresponds with at least one target program map function of the target program map function set, similarly as described regarding block 612 of FIG. 6.

At block 1116, the apparatus identifies a filter map interaction data set to include each map interaction data item from the target program map interaction data set that indicates a geographical region that fails to at least partially correspond with the geographical region of the target program, similarly as described regarding block 1016 of FIG. 10.

At block 1118, the apparatus identifies a replacement map interaction data set to include each map interaction data item from the filter map interaction data set that corresponds with an alternative map interaction data item. The replacement map interaction data set, the map interaction data item, the correspondence, and the alternative map interaction data item may be similar as described regarding FIGS. 2A-2D, FIGS. 3A-3C, FIGS. 4A-4C, and FIGS. 5A-5F.

At block 1120, the apparatus the apparatus replaces each map interaction data item of the target program map interaction data set that is included in the replacement map interaction data set, with an alternative map interaction data item that corresponds with the map interaction data item. The replacement and the correspondence may be similar as described regarding FIGS. 3A-3C and FIGS. 5A-5F. At block 1122, the apparatus sends the target program map interaction data set to the target program, similarly as described regarding block 614 of FIG. 6.

Figure 12:
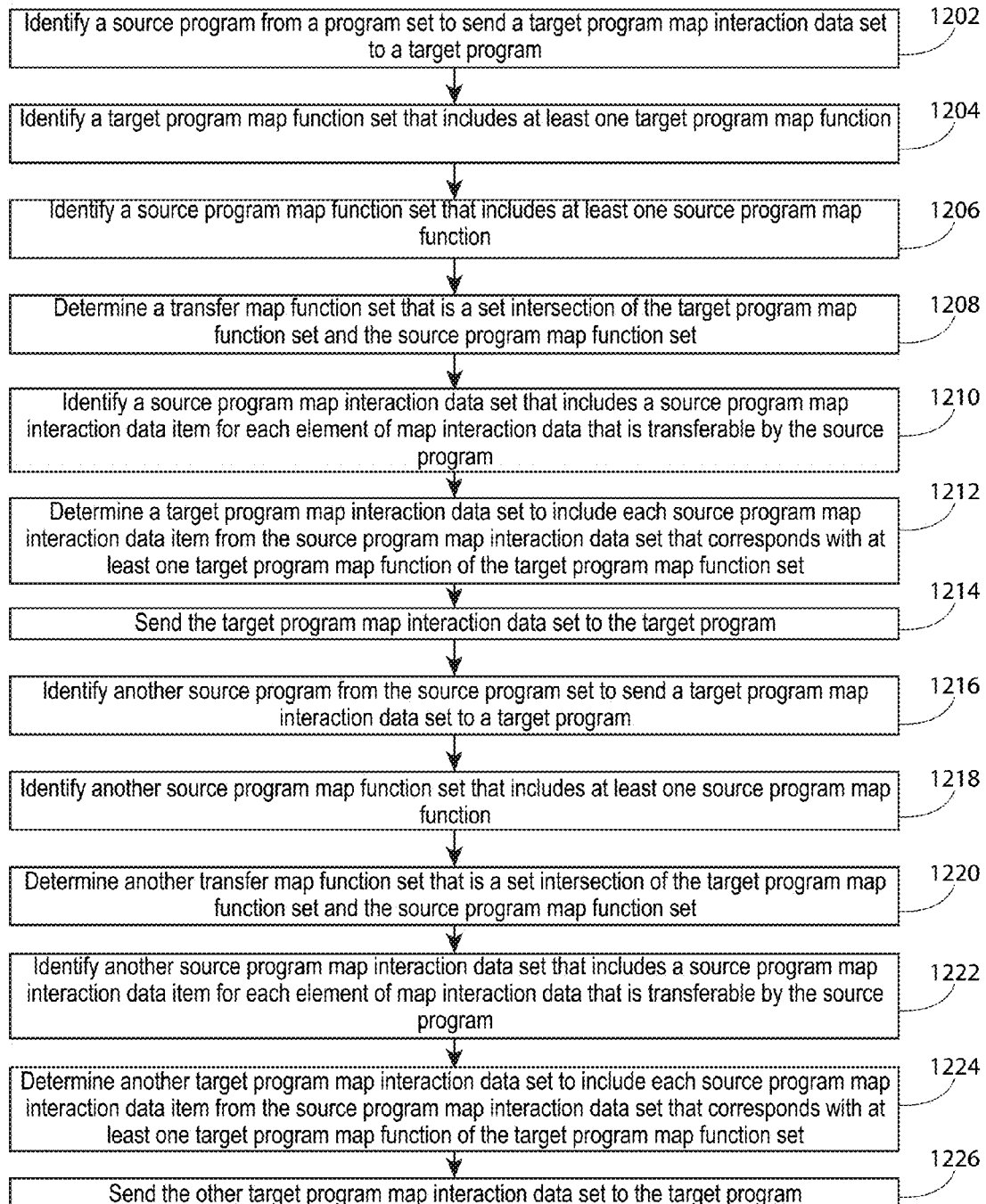
FIG. 12 is a flow diagram illustrating activities associated with sending of map interaction data to a program according to at least one example embodiment.

FIG. 12 is a flow diagram illustrating activities associated with sending of map interaction data to a program according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

As previously described, in some circumstances it may be desirable for multiple programs to send map interaction data to another program.

At block 1202, the apparatus identifies a source program to send a target program map interaction data set to a target program, similarly as described regarding block 602 of FIG. 6. At block 1204, the apparatus identifies a target program map function set that includes at least one target program map function, similarly as described regarding block 604 of FIG. 6. At block 11206, the apparatus identifies a source program map function set that includes at least one source program map function, similarly as described regarding block 606 of FIG. 6. At block 1208, the apparatus determines a transfer map function set that is a set intersection of the target program map function set and the source program map function set, similarly as described regarding block 608 of FIG. 6. At block 1210, the apparatus identifies a source program map interaction data set that includes a source program map interaction data item for each element of map interaction data that is transferable by the source program, similarly as described regarding block 610 of FIG. 6. At block 1212, the apparatus determines a target program map interaction data set to include each source program map interaction data item from the source program map interaction data set that corresponds with at least one target program map function of the target program map function set, similarly as described regarding block 612 of FIG. 6. At block 1214, the apparatus sends the target program map interaction data set to the target program, similarly as described regarding block 614 of FIG. 6.

At block 1216, the apparatus identifies another source program to send a target program map interaction data set to a target program. The identification, the source program, the target program, and the target program map interaction data set may be similar as described regarding FIGS. 2A-2D, FIGS. 3A-3C, FIGS. 4A-4C, and FIGS. 5A-5F.

At block 1218, the apparatus identifies another source program map function set that includes at least one source program map function. The identification, the source program map function set, and the source program map function may be similar as described regarding FIGS. 2A-2D, FIGS. 3A-3C, FIGS. 4A-4C, and FIGS. 5A-5F.

At block 1220, the apparatus determines another transfer map function set that is a set intersection of the target program map function set and the source program map function set. The determination, the transfer map function set, and the intersection may be similar as described regarding FIGS. 2A-2D, FIGS. 3A-3C, FIGS. 4A-4C, and FIGS. 5A-5F.

At block 1222, the apparatus identifies another source program map interaction data set that includes a source program map interaction data item for each element of map interaction data that is transferable by the source program. The identification, the source program map interaction data set, the source map interaction data item, and the element of map interaction data may be similar as described regarding FIGS. 2A-2D, FIGS. 3A-3C, FIGS. 4A-4C, and FIGS. 5A-5F.

At block 1224, the apparatus determines another target program map interaction data set to include each source program map interaction data item from the source program map interaction data set that corresponds with at least one target program map function of the target program map function set. The determination, target program map interaction data set, and the target program map function may be similar as described regarding FIGS. 2A-2D, FIGS. 3A-3C, FIGS. 4A-4C, and FIGS. 5A-5F.

At block 1226, the apparatus sends the other target program map interaction data set to the target program. The sending may be similar as described regarding FIGS. 3A-3C.

One or more example embodiments may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 604 of FIG. 6 may be performed after block 606 of FIG. 6. Furthermore, if desired, one or more of the above-described functions may be optional or may be combined. For example, block 604 of FIG. 6 may be optional and/or combined with block 606 of FIG. 6.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. An apparatus, comprising:
   at least one processor;
   at least one memory including computer program code, the memory and the computer program code configured to, working with the processor, cause the apparatus to perform at least the following:
   identification of a source program to send a target program map interaction data set to a target program;
   identification of a target program map function set that includes at least one target program map function, the target program map function being a map function provided to a user by the target program;
   identification of a source program map function set that includes at least one source program map function, the source program map function being a map function provided to a user by the source program;
   determination of a transfer map function set that is a set intersection of the target program map function set and the source program map function set;
   identification of a source program map interaction data set that includes a source program map interaction data item for each element of map interaction data that is transferable by the source program;
   determination of a target program map interaction data set to include each source program map interaction data item from the source program map interaction data set that corresponds with at least one target program map function of the target program map function set; and
   sending of the target program map interaction data set to the target program.

2. The apparatus of claim 1, wherein the source program map interaction data set comprises a source program map data set.

3. The apparatus of claim 2, wherein the target program map interaction data set comprises a target program map data set.

4. The apparatus of claim 3, wherein the determination of the target program map interaction data set comprises determination of the target program map data set to include each source program map data item from the source program map data set that corresponds with at least one target program map function of the target program map function set.

5. The apparatus of claim 1, wherein the source program map interaction data set comprises a source program interaction data set.

6. The apparatus of claim 5, wherein the target program map interaction data set comprises a target program interaction data set.

7. The apparatus of claim 6, wherein the determination of the target program map interaction data set comprises determination of the target program interaction data set to include each source program interaction data item from the source program interaction data set that corresponds with at least one target program interaction function of the target program interaction function set.

8. The apparatus of claim 1, wherein each map interaction data item of the target program interaction data set indicates a trust threshold, and wherein the memory includes computer program code configured to, working with the processor, cause the apparatus to perform:
   determination of a trust rating for the target program; and
   identification of a filter map interaction data set to include each map interaction data item from the target program map interaction data set that indicates a trust threshold that is beyond the trust rating for the target program.

9. The apparatus of claim 8, wherein the memory includes computer program code configured to, working with the processor, cause the apparatus to perform removal, from the target program map interaction data set, of each map interaction data item that is included in the filter map interaction data set.

10. A method comprising:
    identifying a source program to send a target program map interaction data set to a target program;
    identifying a target program map function set that includes at least one target program map function, the target program map function being a map function provided to a user by the target program;
    identifying a source program map function set that includes at least one source program map function, the source program map function being a map function provided to a user by the source program;
    determining a transfer map function set that is a set intersection of the target program map function set and the source program map function set;
    identifying a source program map interaction data set that includes a source program map interaction data item for each element of map interaction data that is transferable by the source program;
    determining a target program map interaction data set to include each source program map interaction data item from the source program map interaction data set that corresponds with at least one target program map function of the target program map function set; and sending the target program map interaction data set to the target program.

11. The method of claim 10, wherein each map interaction data item of the target program interaction data set indicates a trust threshold, further comprising:

determining a trust rating for the target program; and identifying a filter map interaction data set to include each map interaction data item from the target program map interaction data set that indicates a trust threshold that is beyond the trust rating for the target program.

12. The method of claim 11, further comprising removing, from the target program map interaction data set, of each map interaction data item that is included in the filter map interaction data set.

13. The method of claim 11, further comprising:

identifying a replacement map interaction data set to include each map interaction data item from the filter map interaction data set that corresponds with an alternative map interaction data item; and replacing each map interaction data item of the target program map interaction data set that is included in the replacement map interaction data set, with an alternative map interaction data item that corresponds with the map interaction data item.

14. The method of claim 10, wherein each map interaction data item of the target program interaction data set indicates a geographical region, further comprising:

identifying a geographical region for the target program; and identifying a filter map interaction data set to include each map interaction data item from the target program map interaction data set that indicates a geographical region that fails to at least partially correspond with the geographical region of the target program.

15. The method of claim 14, further comprising removing, from the target program map interaction data set, of each map interaction data item that is included in the filter map interaction data set.

16. The method of claim 14, further comprising:

identifying a replacement map interaction data set to include each map interaction data item from the filter map interaction data set that corresponds with an alternative map interaction data item; and replacing each map interaction data item of the target program map interaction data set that is included in the replacement map interaction data set, with an alternative map interaction data item that corresponds with the map interaction data item.

17. At least one non-transitory computer-readable medium encoded with instructions that, when executed by a processor, perform:

identification of a source program to send a target program map interaction data set to a target program;

identification of a target program map function set that includes at least one target program map function, the target program map function being a map function provided to a user by the target program;

identification of a source program map function set that includes at least one source program map function, the source program map function being a map function provided to a user by the source program;

determination of a transfer map function set that is a set intersection of the target program map function set and the source program map function set;

identification of a source program map interaction data set that includes a source program map interaction data item for each element of map interaction data that is transferable by the source program;

determination of a target program map interaction data set to include each source program map interaction data item from the source program map interaction data set that corresponds with at least one target program map function of the target program map function set; and sending of the target program map interaction data set to the target program.

18. The medium of claim 17, wherein the source program is included in a source program set, further encoded with instructions that, when executed by a processor, perform:

identification of another source program map function set that includes at least one source program map function, the source program map function included in the other source program map function set being a map function provided to a user by the other source program;

determination of another transfer map function set that is a set intersection of the target program map function set and the other source program map function set;

identification of another source program map interaction data set that includes a source program map interaction data item for each element of map interaction data that is transferable by the other source program;

determination of another target program map interaction data set to include each source program map interaction data item from the other source program map interaction data set that corresponds with at least one target program map function of the target program map function set; and sending of the other target program map interaction data set to the target program.

19. The medium of claim 17, wherein the source program map interaction data set comprises a source program map data set.

20. The medium of claim 17, wherein the target program map interaction data set comprises a target program map data set.

* * * * *

UNITED STATES PATENT AND TRADEMARK OFFICE
CERTIFICATE OF CORRECTION

PATENT NO. : 9,547,538 B2
APPLICATION NO. : 14/689031
DATED : January 17, 2017
INVENTOR(S) : Biswas et al.

It is certified that error appears in the above-identified patent and that said Letters Patent is hereby corrected as shown below:

In the Claims

Column 33,
Line 47, "perfotm" should read --perform--.

Signed and Sealed this
Seventeenth Day of October, 2017

Joseph Matal
*Performing the Functions and Duties of the
Under Secretary of Commerce for Intellectual Property and
Director of the United States Patent and Trademark Office*